US012640881B2

(12) United States Patent
Vassilovski et al.

(10) Patent No.: US 12,640,881 B2
(45) Date of Patent: May 26, 2026

(54) SIDELINK POSITIONING PRIORITIZATION

(71) Applicant: QUALCOMM Incorporated, San Diego, CA (US)

(72) Inventors: Dan Vassilovski, Del Mar, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 317 days.

(21) Appl. No.: 18/420,549

(22) Filed: Jan. 23, 2024

(65) Prior Publication Data
US 2025/0240139 A1 Jul. 24, 2025

(51) Int. Cl.
*H04L 5/00* (2006.01)

(52) U.S. Cl.
CPC .......... *H04L 5/0051* (2013.01); *H04L 5/0064* (2013.01)

(58) Field of Classification Search
CPC ..... H04W 64/00; H04W 92/18; H04W 72/25; H04W 76/14; H04W 4/40; H04W 4/029; H04W 4/02; H04W 72/40; H04L 5/0051; H04L 5/0094; H04L 5/0048; H04L 5/0064
See application file for complete search history.

(56) References Cited

U.S. PATENT DOCUMENTS

| | | | | |
|---|---|---|---|---|
| 2023/0171750 A1* | 6/2023 | Lee | ........................ | H04L 5/005 |
| | | | | 370/329 |
| 2024/0224302 A1* | 7/2024 | Li | ........................ | H04L 5/0048 |
| 2024/0381378 A1* | 11/2024 | Lee | ...................... | H04W 72/25 |
| 2025/0056483 A1* | 2/2025 | Kakkavas | ............. | H04W 64/00 |
| 2025/0365696 A1* | 11/2025 | Zhang | ................... | H04W 72/25 |

* cited by examiner

*Primary Examiner* — Allahyar Kasraian
(74) *Attorney, Agent, or Firm* — QUALCOMM Incorporated

(57) ABSTRACT

Disclosed are techniques for wireless communication. In an aspect, a user equipment (UE) transmits first non-positioning data in a first-occurring transmission opportunity of a plurality of transmission opportunities based on the first non-positioning data having a higher priority than a sidelink positioning reference signal (SL-PRS) scheduled to be transmitted in the first-occurring transmission opportunity, and transmits second non-positioning data in a second-occurring transmission opportunity of the plurality of transmission opportunities, wherein the second non-positioning data has a lower priority than sidelink positioning protocol (SLPP) data scheduled to be transmitted in the second-occurring transmission opportunity, and wherein the second non-positioning data is transmitted in the second-occurring transmission opportunity instead of the SLPP data scheduled to be transmitted in the second-occurring transmission opportunity based on the SLPP data being associated with the SL-PRS.

30 Claims, 13 Drawing Sheets

400

500

550

600

SL-PRS

700

Scenario A

UL Priority = 1
Transmit UL data

SL-PRS Priority = 8
Drop SL-PRS

UL Priority = 8
Transmit UL data

SLPP Priority = 1
Drop SLPP 0                    1                    Time (e.g., Slots)

750

Scenario B

UL Priority = 1
Transmit UL data

SL-PRS Priority = 8
Drop SL-PRS

UL Priority = 1
Transmit UL data

SLPP Priority = 1
Drop SLPP 0                    1                    Time (e.g., Slots)

800

Scenario A

UL Priority = 8
Drop UL data

SL-PRS Priority = 1
Transmit SL-PRS

UL Priority = 1
Transmit UL data

SLPP Priority = 8
Drop SLPP 0        1      *Time (e.g., Slots)*

850

Scenario B

UL Priority = 8
Drop UL data

SL-PRS Priority = 1
Transmit SL-PRS

UL Priority = 8
Transmit UL data

SLPP Priority = 8
Drop SLPP 0        1      *Time (e.g., Slots)*

900

Scenario A

UL Priority = 4
Drop UL data

SL-PRS Priority = 8
Transmit SL-PRS

UL Priority = 4
Drop UL data

SLPP Priority = 1
Transmit SLPP 0              1         *Time (e.g., Slots)*

950

Scenario B

UL Priority = 4
Transmit UL data

SL-PRS Priority = 8
Drop SL-PRS

UL Priority = 4
Transmit UL data

SLPP Priority = 4
Drop SLPP 0              1         *Time (e.g., Slots)*

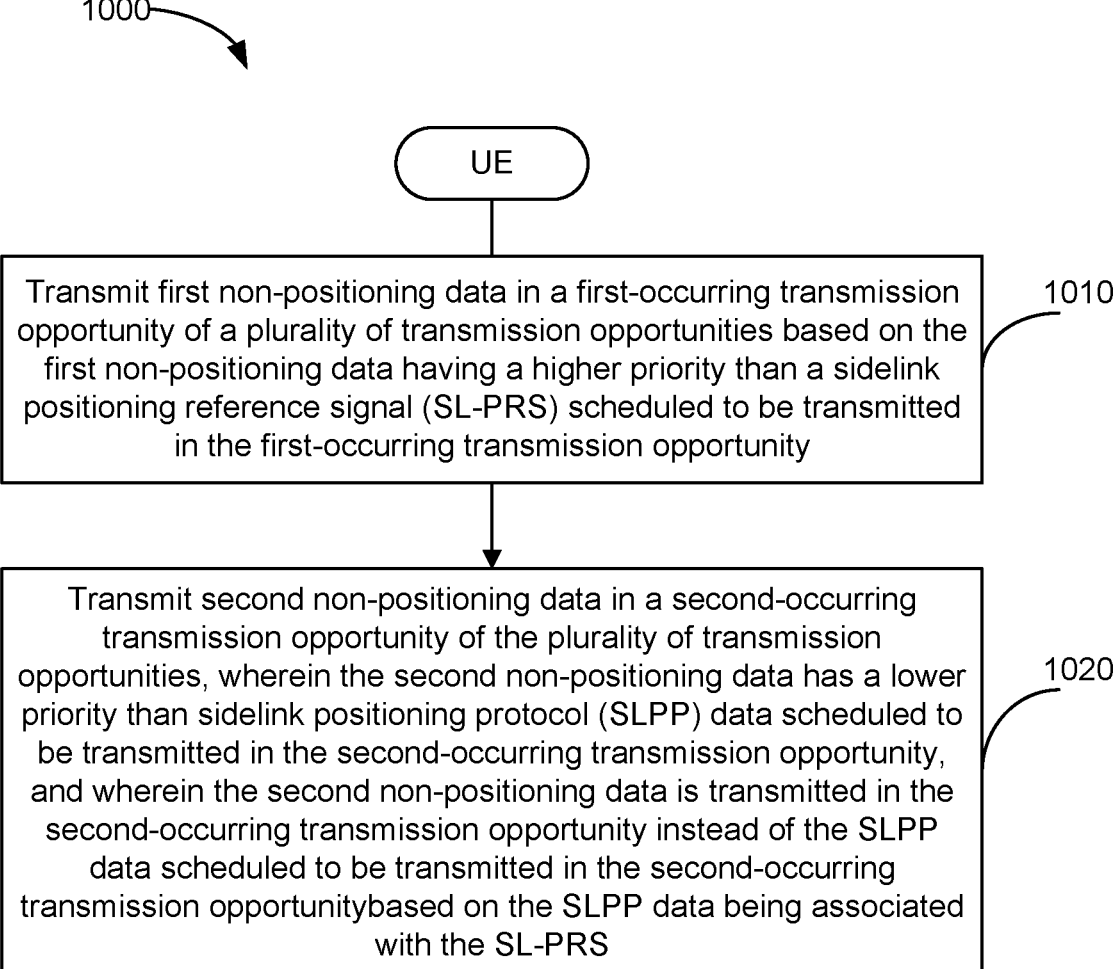

1000

UE

Transmit first non-positioning data in a first-occurring transmission opportunity of a plurality of transmission opportunities based on the first non-positioning data having a higher priority than a sidelink positioning reference signal (SL-PRS) scheduled to be transmitted in the first-occurring transmission opportunity    1010

Transmit second non-positioning data in a second-occurring transmission opportunity of the plurality of transmission opportunities, wherein the second non-positioning data has a lower priority than sidelink positioning protocol (SLPP) data scheduled to be transmitted in the second-occurring transmission opportunity, and wherein the second non-positioning data is transmitted in the second-occurring transmission opportunity instead of the SLPP data scheduled to be transmitted in the second-occurring transmission opportunitybased on the SLPP data being associated with the SL-PRS    1020

*FIG. 10*

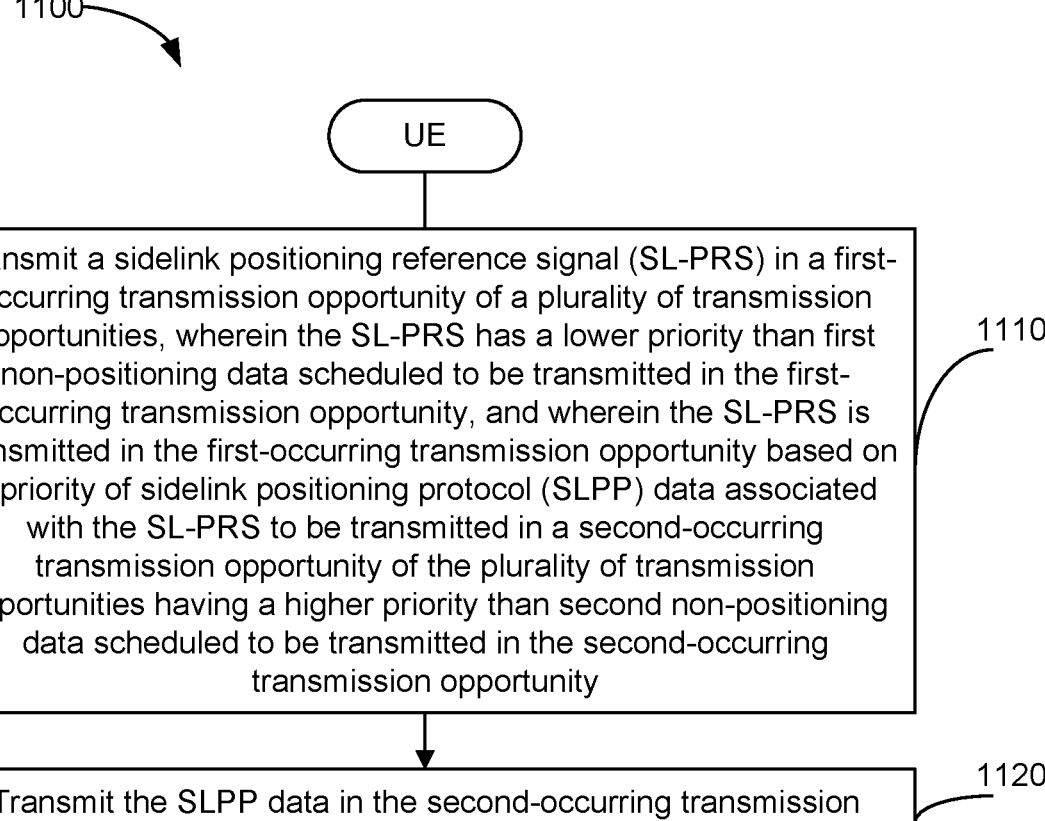

1100

UE

Transmit a sidelink positioning reference signal (SL-PRS) in a first-occurring transmission opportunity of a plurality of transmission opportunities, wherein the SL-PRS has a lower priority than first non-positioning data scheduled to be transmitted in the first-occurring transmission opportunity, and wherein the SL-PRS is transmitted in the first-occurring transmission opportunity based on a priority of sidelink positioning protocol (SLPP) data associated with the SL-PRS to be transmitted in a second-occurring transmission opportunity of the plurality of transmission opportunities having a higher priority than second non-positioning data scheduled to be transmitted in the second-occurring transmission opportunity

1110

Transmit the SLPP data in the second-occurring transmission opportunity

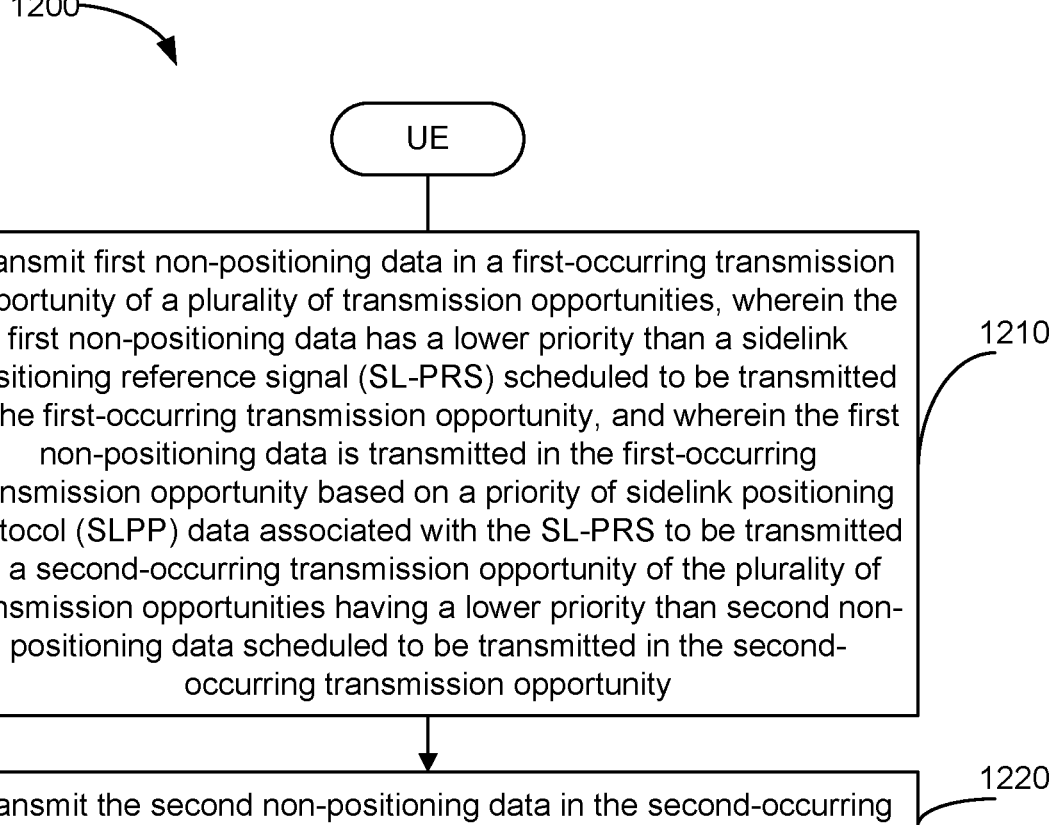

1200

UE

Transmit first non-positioning data in a first-occurring transmission opportunity of a plurality of transmission opportunities, wherein the first non-positioning data has a lower priority than a sidelink positioning reference signal (SL-PRS) scheduled to be transmitted in the first-occurring transmission opportunity, and wherein the first non-positioning data is transmitted in the first-occurring transmission opportunity based on a priority of sidelink positioning protocol (SLPP) data associated with the SL-PRS to be transmitted in a second-occurring transmission opportunity of the plurality of transmission opportunities having a lower priority than second non-positioning data scheduled to be transmitted in the second-occurring transmission opportunity

1210

Transmit the second non-positioning data in the second-occurring transmission opportunity

SIDELINK POSITIONING PRIORITIZATION

BACKGROUND OF THE DISCLOSURE

1. Field of the Disclosure

Aspects of the disclosure relate generally to wireless technologies.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)) and other technical enhancements.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes transmitting first non-positioning data in a first-occurring transmission opportunity of a plurality of transmission opportunities based on the first non-positioning data having a higher priority than a sidelink positioning reference signal (SL-PRS) scheduled to be transmitted in the first-occurring transmission opportunity; and transmitting second non-positioning data in a second-occurring transmission opportunity of the plurality of transmission opportunities, wherein the second non-positioning data has a lower priority than sidelink positioning protocol (SLPP) data scheduled to be transmitted in the second-occurring transmission opportunity, and wherein the second non-positioning data is transmitted in the second-occurring transmission opportunity instead of the SLPP data scheduled to be transmitted in the second-occurring transmission opportunity based on the SLPP data being associated with the SL-PRS.

In an aspect, a method of wireless communication performed by a user equipment (UE) includes transmitting a sidelink positioning reference signal (SL-PRS) in a first-occurring transmission opportunity of a plurality of transmission opportunities, wherein the SL-PRS has a lower priority than first non-positioning data scheduled to be transmitted in the first-occurring transmission opportunity, and wherein the SL-PRS is transmitted in the first-occurring transmission opportunity based on a priority of sidelink positioning protocol (SLPP) data associated with the SL-PRS to be transmitted in a second-occurring transmission opportunity of the plurality of transmission opportunities having a higher priority than second non-positioning data scheduled to be transmitted in the second-occurring transmission opportunity; and transmitting the SLPP data in the second-occurring transmission opportunity.

In an aspect, a method of wireless communication performed by a user equipment (UE) includes transmitting first non-positioning data in a first-occurring transmission opportunity of a plurality of transmission opportunities, wherein the first non-positioning data has a lower priority than a sidelink positioning reference signal (SL-PRS) scheduled to be transmitted in the first-occurring transmission opportunity, and wherein the first non-positioning data is transmitted in the first-occurring transmission opportunity based on a priority of sidelink positioning protocol (SLPP) data associated with the SL-PRS to be transmitted in a second-occurring transmission opportunity of the plurality of transmission opportunities having a lower priority than second non-positioning data scheduled to be transmitted in the second-occurring transmission opportunity; and transmitting the second non-positioning data in the second-occurring transmission opportunity.

In an aspect, a user equipment (UE) includes one or more memories; one or more transceivers; and one or more processors communicatively coupled to the one or more memories and the one or more transceivers, the one or more processors, either alone or in combination, configured to: transmit, via the one or more transceivers, first non-positioning data in a first-occurring transmission opportunity of a plurality of transmission opportunities based on the first non-positioning data having a higher priority than a sidelink positioning reference signal (SL-PRS) scheduled to be transmitted in the first-occurring transmission opportunity; and transmit, via the one or more transceivers, second non-positioning data in a second-occurring transmission opportunity of the plurality of transmission opportunities, wherein the second non-positioning data has a lower priority than sidelink positioning protocol (SLPP) data scheduled to be transmitted in the second-occurring transmission opportunity, and wherein the second non-positioning data is transmitted in the second-occurring transmission opportunity instead of the SLPP data scheduled to be transmitted in the second-occurring transmission opportunity based on the SLPP data being associated with the SL-PRS.

In an aspect, a user equipment (UE) includes one or more memories; one or more transceivers; and one or more processors communicatively coupled to the one or more memories and the one or more transceivers, the one or more processors, either alone or in combination, configured to: transmit, via the one or more transceivers, a sidelink positioning reference signal (SL-PRS) in a first-occurring transmission opportunity of a plurality of transmission opportunities, wherein the SL-PRS has a lower priority than first non-positioning data scheduled to be transmitted in the first-occurring transmission opportunity, and wherein the SL-PRS is transmitted in the first-occurring transmission opportunity based on a priority of sidelink positioning protocol (SLPP) data associated with the SL-PRS to be transmitted in a second-occurring transmission opportunity of the plurality of transmission opportunities having a higher priority than second non-positioning data scheduled to be transmitted in the second-occurring transmission opportunity; and transmit, via the one or more transceivers, the SLPP data in the second-occurring transmission opportunity.

In an aspect, a user equipment (UE) includes one or more memories; one or more transceivers; and one or more processors communicatively coupled to the one or more memories and the one or more transceivers, the one or more processors, either alone or in combination, configured to: transmit, via the one or more transceivers, first non-positioning data in a first-occurring transmission opportunity of a plurality of transmission opportunities, wherein the first non-positioning data has a lower priority than a sidelink positioning reference signal (SL-PRS) scheduled to be transmitted in the first-occurring transmission opportunity, and wherein the first non-positioning data is transmitted in the first-occurring transmission opportunity based on a priority of sidelink positioning protocol (SLPP) data associated with the SL-PRS to be transmitted in a second-occurring transmission opportunity of the plurality of transmission opportunities having a lower priority than second non-positioning data scheduled to be transmitted in the second-occurring transmission opportunity; and transmit, via the one or more transceivers, the second non-positioning data in the second-occurring transmission opportunity.

In an aspect, a user equipment (UE) includes means for transmitting first non-positioning data in a first-occurring transmission opportunity of a plurality of transmission opportunities based on the first non-positioning data having a higher priority than a sidelink positioning reference signal (SL-PRS) scheduled to be transmitted in the first-occurring transmission opportunity; and means for transmitting second non-positioning data in a second-occurring transmission opportunity of the plurality of transmission opportunities, wherein the second non-positioning data has a lower priority than sidelink positioning protocol (SLPP) data scheduled to be transmitted in the second-occurring transmission opportunity, and wherein the second non-positioning data is transmitted in the second-occurring transmission opportunity instead of the SLPP data scheduled to be transmitted in the second-occurring transmission opportunity based on the SLPP data being associated with the SL-PRS.

In an aspect, a user equipment (UE) includes means for transmitting a sidelink positioning reference signal (SL-PRS) in a first-occurring transmission opportunity of a plurality of transmission opportunities, wherein the SL-PRS has a lower priority than first non-positioning data scheduled to be transmitted in the first-occurring transmission opportunity, and wherein the SL-PRS is transmitted in the first-occurring transmission opportunity based on a priority of sidelink positioning protocol (SLPP) data associated with the SL-PRS to be transmitted in a second-occurring transmission opportunity of the plurality of transmission opportunities having a higher priority than second non-positioning data scheduled to be transmitted in the second-occurring transmission opportunity; and means for transmitting the SLPP data in the second-occurring transmission opportunity.

In an aspect, a user equipment (UE) includes means for transmitting first non-positioning data in a first-occurring transmission opportunity of a plurality of transmission opportunities, wherein the first non-positioning data has a lower priority than a sidelink positioning reference signal (SL-PRS) scheduled to be transmitted in the first-occurring transmission opportunity, and wherein the first non-positioning data is transmitted in the first-occurring transmission opportunity based on a priority of sidelink positioning protocol (SLPP) data associated with the SL-PRS to be transmitted in a second-occurring transmission opportunity of the plurality of transmission opportunities having a lower priority than second non-positioning data scheduled to be transmitted in the second-occurring transmission opportunity; and means for transmitting the second non-positioning data in the second-occurring transmission opportunity.

In an aspect, a non-transitory computer-readable medium stores computer-executable instructions that, when executed by a user equipment (UE), cause the UE to: transmit first non-positioning data in a first-occurring transmission opportunity of a plurality of transmission opportunities based on the first non-positioning data having a higher priority than a sidelink positioning reference signal (SL-PRS) scheduled to be transmitted in the first-occurring transmission opportunity; and transmit second non-positioning data in a second-occurring transmission opportunity of the plurality of transmission opportunities, wherein the second non-positioning data has a lower priority than sidelink positioning protocol (SLPP) data scheduled to be transmitted in the second-occurring transmission opportunity, and wherein the second non-positioning data is transmitted in the second-occurring transmission opportunity instead of the SLPP data scheduled to be transmitted in the second-occurring transmission opportunity based on the SLPP data being associated with the SL-PRS.

In an aspect, a non-transitory computer-readable medium stores computer-executable instructions that, when executed by a user equipment (UE), cause the UE to: transmit a sidelink positioning reference signal (SL-PRS) in a first-occurring transmission opportunity of a plurality of transmission opportunities, wherein the SL-PRS has a lower priority than first non-positioning data scheduled to be transmitted in the first-occurring transmission opportunity, and wherein the SL-PRS is transmitted in the first-occurring transmission opportunity based on a priority of sidelink positioning protocol (SLPP) data associated with the SL-PRS to be transmitted in a second-occurring transmission opportunity of the plurality of transmission opportunities having a higher priority than second non-positioning data scheduled to be transmitted in the second-occurring transmission opportunity; and transmit the SLPP data in the second-occurring transmission opportunity.

In an aspect, a non-transitory computer-readable medium stores computer-executable instructions that, when executed by a user equipment (UE), cause the UE to: transmit first non-positioning data in a first-occurring transmission opportunity of a plurality of transmission opportunities, wherein the first non-positioning data has a lower priority than a sidelink positioning reference signal (SL-PRS) scheduled to be transmitted in the first-occurring transmission opportunity, and wherein the first non-positioning data is transmitted in the first-occurring transmission opportunity based on a priority of sidelink positioning protocol (SLPP) data associated with the SL-PRS to be transmitted in a second-occurring transmission opportunity of the plurality of transmission opportunities having a lower priority than second non-positioning data scheduled to be transmitted in the second-occurring transmission opportunity; and transmit the second non-positioning data in the second-occurring transmission opportunity.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIGS. 10 to 12 illustrate example methods of wireless communication, according to aspects of the disclosure.

DETAILED DESCRIPTION

Figure 1:
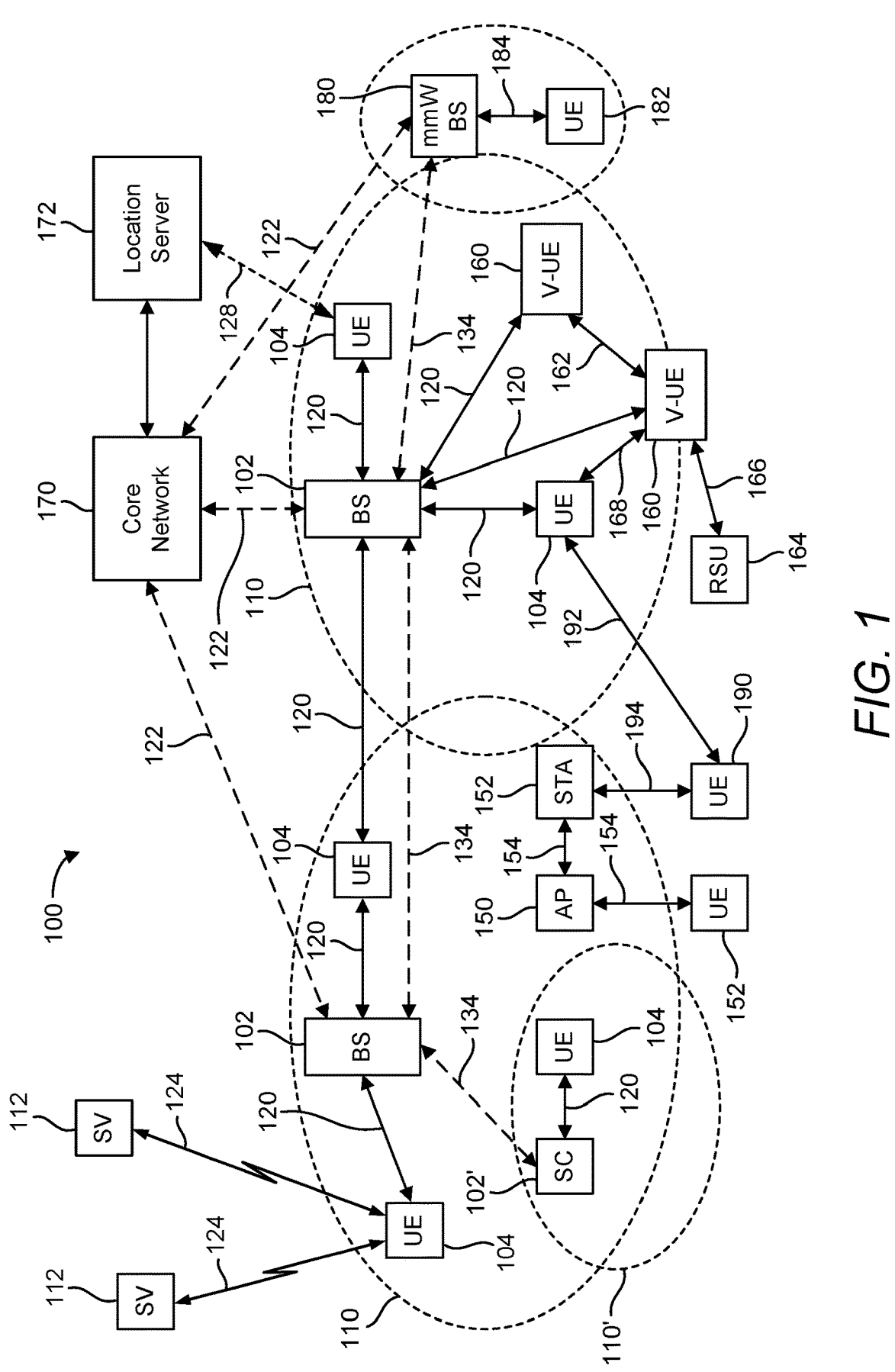
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Various aspects relate generally to wireless technologies. Some aspects more specifically relate to sidelink positioning. In some examples, a UE may have uplink data and sidelink positioning reference signal (SL-PRS) transmissions of different priorities and adjust transmission based on the priorities. In some examples, the UE may override the default prioritization. In some examples, the UE may maintain a history (or state) of prior transmissions to determine whether SL-PRS should be transmitted. In some examples, the UE may evaluate based on look-ahead for SL-PRS and/or sidelink positioning protocol (SLPP) transmissions.

Particular aspects of the subject matter described in this disclosure can be implemented to realize one or more of the following potential advantages. In some examples, by maintaining a history (or state) of prior transmissions, the described techniques can be used to enable the UE to prioritize or drop SLPP data based on the prioritization of SL-PRS relative to non-positioning data.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a heads-up display (HUD), an on-board computer, an in-vehicle infotainment system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHZ). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MULTEFIRE®.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHZ) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the INTERNATIONAL TELECOMMUNICATION UNION® as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHZ), FR4 (52.6 GHz-114.25 GHz), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHZ), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multifunctional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 using the Uu interface (i.e., the air interface between a UE and a base station). V-UEs 160 may also communicate directly with each other over a wireless sidelink 162, with a roadside unit (RSU) 164 (a roadside access point) over a wireless sidelink 166, or with sidelink-capable UEs 104 over a wireless sidelink 168 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (cV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHZ. Other bands may be allocated in other countries. Thus, as a particular example, the medium of interest utilized by sidelinks 162, 166, 168 may correspond to at least a portion of the licensed ITS frequency band of sub-6 GHZ. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHZ (5.85-5.925 GHZ) in the U.S. In Europe, IEEE 802.11p operates in the ITS G5A band (5.875-5.905 MHZ). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHZ) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHZ.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more RSUs 164 are referred to as V21 communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V21 information received at a V-UE 160 from the one or more RSUs 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards RSUs 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WI-FI DIRECT®, BLUETOOTH®, and so on. As another example, the D2D P2P links 192 and 194 may be sidelinks, as described above with reference to sidelinks 162, 166, and 168.

Figure 2A:
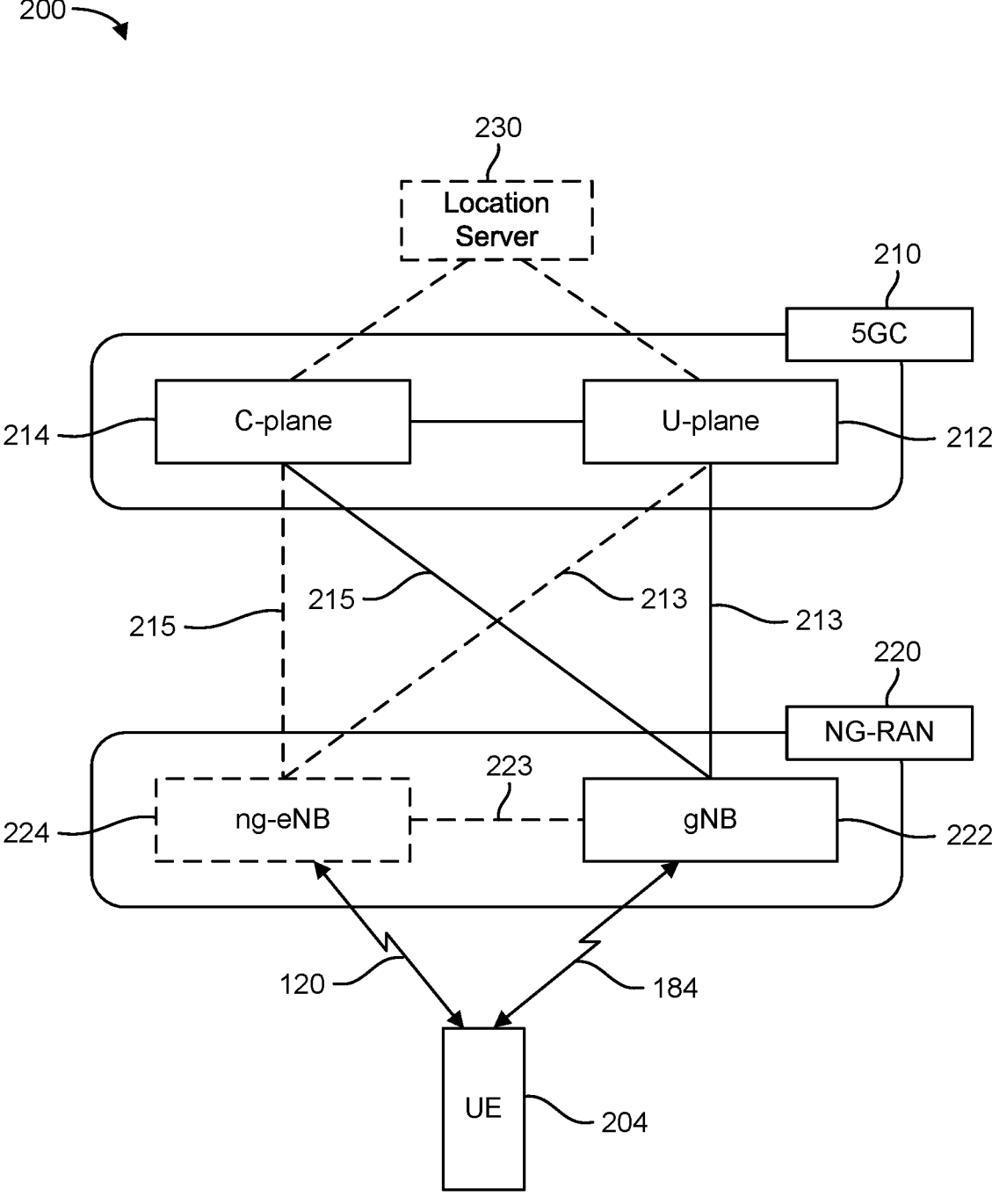
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
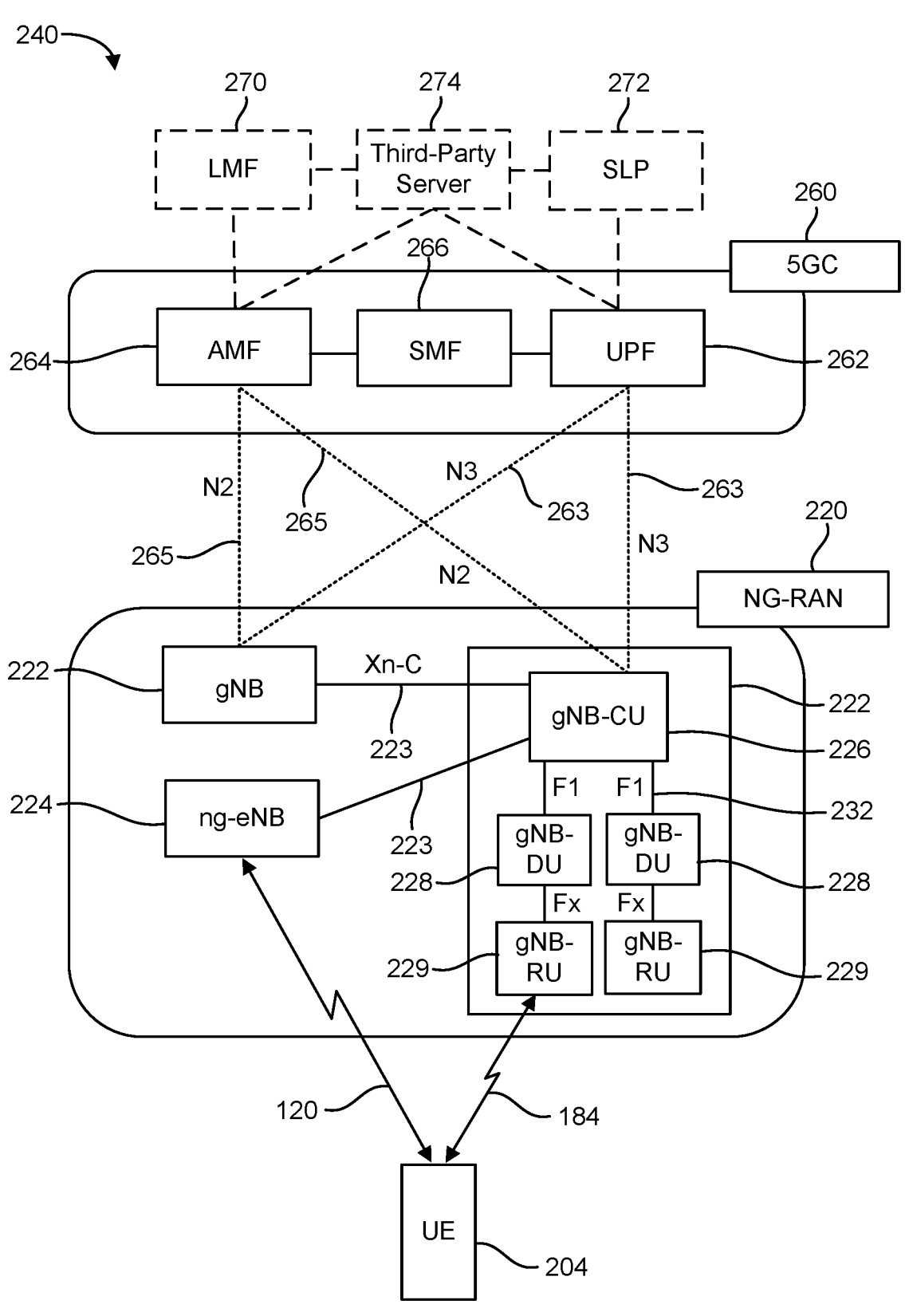

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP® (Third Generation Partnership Project) access networks.

Functions of the UPF 262 include acting as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3:
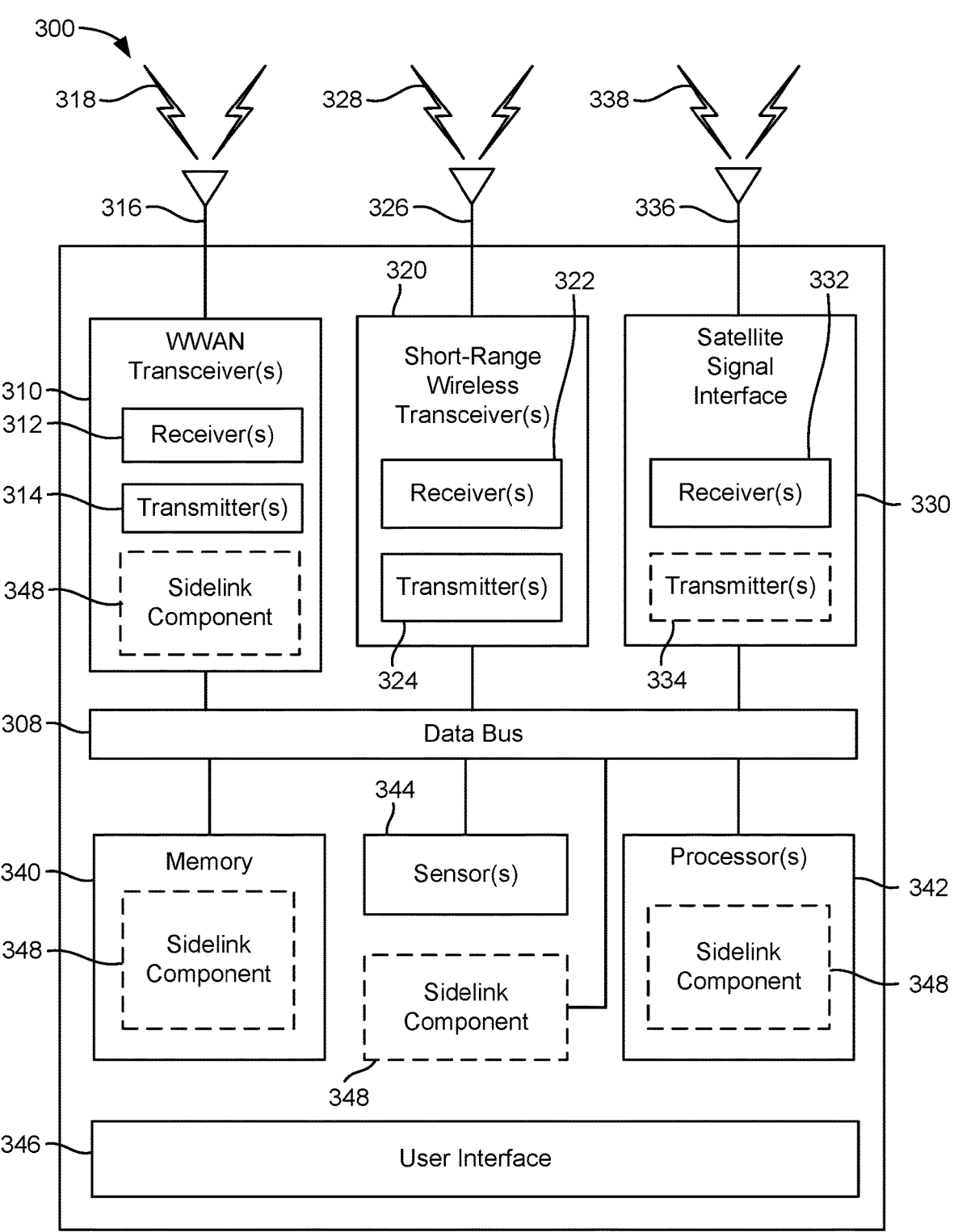
FIG. 3 illustrates an example user equipment (UE) architecture, according to various aspects of the disclosure.

FIG. 3 illustrates several example components (represented by corresponding blocks) that may be incorporated into a UE 300 (which may correspond to any of the UEs described herein). It will be appreciated that these components may be implemented in different types of apparatuses in different implementations (e.g., in an application-specific integrated circuit (ASIC), in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 300 includes one or more wireless wide area network (WWAN) transceivers 310 providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The one or more WWAN transceivers 310 may each be connected to one or more antennas 316 for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The one or more WWAN transceivers 310 may be variously configured for transmitting and encoding signals 318 (e.g., messages, indications, information, and so on) and, conversely, for receiving and decoding signals 318 (e.g., messages, indications, information, pilots, and so on) in accordance with the designated RAT. Specifically, the one or more WWAN transceivers 310 include one or more transmitters 314 for transmitting and encoding signals 318 and one or more receivers 312 for receiving and decoding signals 318.

The UE 300 also includes, at least in some cases, one or more short-range wireless transceivers 320. The one or more short-range wireless transceivers 320 may be connected to one or more antennas 326 and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., Wi-Fi, LTE-D, BLUETOOTH®, ZIG-BEE®, Z-WAVE®, PC5, dedicated short-range communications (DSRC), wireless access for vehicular environments (WAVE), near-field communication (NFC), ultra-wideband (UWB), etc.) over a wireless communication medium of interest. The one or more short-range wireless transceivers 320 may be variously configured for transmitting and encoding signals 328 (e.g., messages, indications, information, and so on) and, conversely, for receiving and decoding signals 328 (e.g., messages, indications, information, pilots, and so on) in accordance with the designated RAT. Specifically, the one or more short-range wireless transceivers 320 include one or more transmitters 324 for transmitting and encoding signals 328 and one or more receivers 322 for receiving and decoding signals 328. As specific examples, the one or more short-range wireless transceivers 320 may be Wi-Fi transceivers, BLUETOOTH® transceivers, ZIG-BEE® and/or Z-WAVE® transceivers, NFC transceivers, UWB transceivers, or vehicle-to-vehicle (V2V) and/or vehicle-to-everything (V2X) transceivers.

The UE 300 also includes, at least in some cases, a satellite signal interface 330, which includes one or more satellite signal receivers 332 and may optionally include one or more satellite signal transmitters 334. The one or more satellite signal receivers 332 may be connected to one or more antennas 336 and may provide means for receiving and/or measuring satellite positioning/communication signals 338. Where the one or more satellite signal receivers 332 include a satellite positioning system receiver, the satellite positioning/communication signals 338 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the one or more satellite signal receivers 332 include a non-terrestrial network (NTN) receiver, the satellite positioning/communication signals 338 may be communication signals (e.g., carrying control and/or user data) originating from a 5G network. The one or more satellite signal receivers 332 may comprise any suitable hardware and/or software for receiving and processing satellite positioning/communication signals 338. The one or more satellite signal receivers 332 may request information and operations as appropriate from the other systems, and, at least in some cases, perform calculations to determine locations of the UE 300 using measurements obtained by any suitable satellite positioning system algorithm.

The optional satellite signal transmitter(s) 334, when present, may be connected to the one or more antennas 336 and may provide means for transmitting satellite positioning/communication signals 338. Where the one or more satellite signal transmitters 334 include an NTN transmitter, the satellite positioning/communication signals 338 may be communication signals (e.g., carrying control and/or user data) originating from a 5G network. The one or more satellite signal transmitters 334 may comprise any suitable hardware and/or software for transmitting satellite positioning/communication signals 338. The one or more satellite signal transmitters 334 may request information and operations as appropriate from the other systems.

A transceiver may be configured to communicate over a wired or wireless link. A transceiver (whether a wired transceiver or a wireless transceiver) includes transmitter circuitry (e.g., transmitters 314, 324) and receiver circuitry (e.g., receivers 312, 322). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver may be coupled to one or more wired network interface ports. Wireless transmitter circuitry (e.g., transmitters 314, 324) may include or be coupled to a plurality of antennas (e.g., antennas 316, 326), such as an antenna array, that permits the respective apparatus (e.g., UE 300) to perform transmit "beamforming," as described herein. Similarly, wireless receiver circuitry (e.g., receivers 312, 322) may include or be coupled to a plurality of antennas (e.g., antennas 316, 326), such as an antenna array, that permits the respective apparatus (e.g., UE 300) to perform receive beamforming, as described herein. In an aspect, the transmitter circuitry and receiver circuitry may share the same plurality of antennas (e.g., antennas 316, 326), such that the respective apparatus can only receive or transmit at a given time, not both at the same time. A wireless transceiver (e.g., the one or more WWAN transceivers 310, the one or more short-range wireless transceivers 320) may also include a network listen module (NLM) or the like for performing various measurements.

As used herein, the various wireless transceivers (e.g., transceivers 310, 320) and wired transceivers may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 300) and a base station will generally relate to signaling via a wireless transceiver.

The UE 300 also includes other components that may be used in conjunction with the operations as disclosed herein. The UE 300 includes one or more processors 342 for providing functionality relating to, for example, wireless communication, and for providing other processing functionality. The one or more processors 342 may therefore provide means for processing, such as means for determining, means for calculating, means for receiving, means for transmitting, means for indicating, etc. In an aspect, the one or more processors 342 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 300 includes memory circuitry implementing memory 340 (e.g., each including a memory device) for maintaining information (e.g., information indicative of reserved resources, thresholds, parameters, and so on). The memory 340 may therefore provide means for storing, means for retrieving, means for maintaining, etc. In some cases, the UE 300 may include a sidelink component 348. The sidelink component 348 may be hardware circuits that are part of or coupled to the one or more processors 342 that, when executed, cause the UE 300 to perform the function- ality described herein. In other aspects, the sidelink compo- nent 348 may be external to the processors 342 (e.g., part of a modem processing system, integrated with another pro- cessing system, etc.). Alternatively, the sidelink component 348 may be a memory module stored in the memory 340 that, when executed by the one or more processors 342 (or a modem processing system, another processing system, etc.), cause the UE 300 to perform the functionality described herein. FIG. 3 illustrates possible locations of the sidelink component 348, which may be, for example, part of the one or more WWAN transceivers 310, the memory 340, the one or more processors 342, or any combination thereof, or may be a standalone component.

The UE 300 may include one or more sensors 344 coupled to the one or more processors 342 to provide means for sensing or detecting movement and/or orientation informa- tion that is independent of motion data derived from signals received by the one or more WWAN transceivers 310, the one or more short-range wireless transceivers 320, and/or the satellite signal interface 330. By way of example, the sensor(s) 344 may include one or more accelerometers (e.g., micro-electrical mechanical systems (MEMS) devices), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two- dimensional (2D) and/or three-dimensional (3D) coordinate systems. Note that at least the accelerometer and gyroscope may be referred to as "inertial" sensors.

The various components of the UE 300 may be commu- nicatively coupled to each other over a data bus 308. In an aspect, the data bus 308 may form, or be part of, a commu- nication interface of the UE 300.

In addition, the UE 300 includes a user interface 346 providing means for providing indications (e.g., audible and/or visual indications) to a user and/or for receiving user input (e.g., upon user actuation of a sensing device such a keypad, a touch screen, a microphone, and so on).

For convenience, the UE 300 is shown in FIG. 3 as including various components that may be configured according to the various examples described herein. It will be appreciated, however, that the illustrated components may have different functionality in different designs. In particular, various components in FIG. 3 are optional in alternative configurations and the various aspects include configurations that may vary due to design choice, costs, use of the device, or other considerations. For example, a particular implementation of UE 300 may omit the WWAN transceiver(s) 310 (e.g., a wearable device or tablet com- puter or PC or laptop may have Wi-Fi and/or BLU- ETOOTH® capability without cellular capability), or may omit the short-range wireless transceiver(s) 320 (e.g., cel- lular-only, etc.), or may omit the satellite signal interface

330, or may omit the sensor(s) 344, and so on. For brevity, illustration of the various alternative configurations is not provided herein, but would be readily understandable to one skilled in the art.

The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory com- ponent(s) of the UE 300 (e.g., by execution of appropriate code and/or by appropriate configuration of processor com- ponents). For simplicity, various operations, acts, and/or functions are described herein as being performed "by a UE." However, as will be appreciated, such operations, acts, and/or functions may actually be performed by specific components or combinations of components of the UE 300, such as the one or more processors 342, the one or more transceivers 310 and 320, the memory 340, the sidelink component 348, etc.

NR supports various sidelink ranging techniques. Side- link-based ranging and positioning (SLRP) enables the determination of the relative distance(s) between UEs and optionally their absolute position(s), where the absolute position of at least one involved UE is known. This tech- nique is valuable in situations where global navigation satellite system (GNSS) positioning is degraded or unavail- able (e.g., tunnels, urban canyons, etc.) and can also enhance range and positioning accuracy when GNSS is available.

SLRP is based on calculating an inter-UE round-trip-time (RTT) measurement, as determined from the transmit and receive times of sidelink positioning reference signals (SL- PRS) (a wideband positioning signal defined for sidelink- based positioning, described in greater detail with reference to FIG. 6). Each UE reports an RTT measurement to all other participating UEs, along with its location (if known). For UEs having zero or inaccurate knowledge of their location, the RTT procedure yields an inter-UE range between the involved UEs. For UEs having accurate knowledge of their location, the range yields an absolute position.

Figure 4:
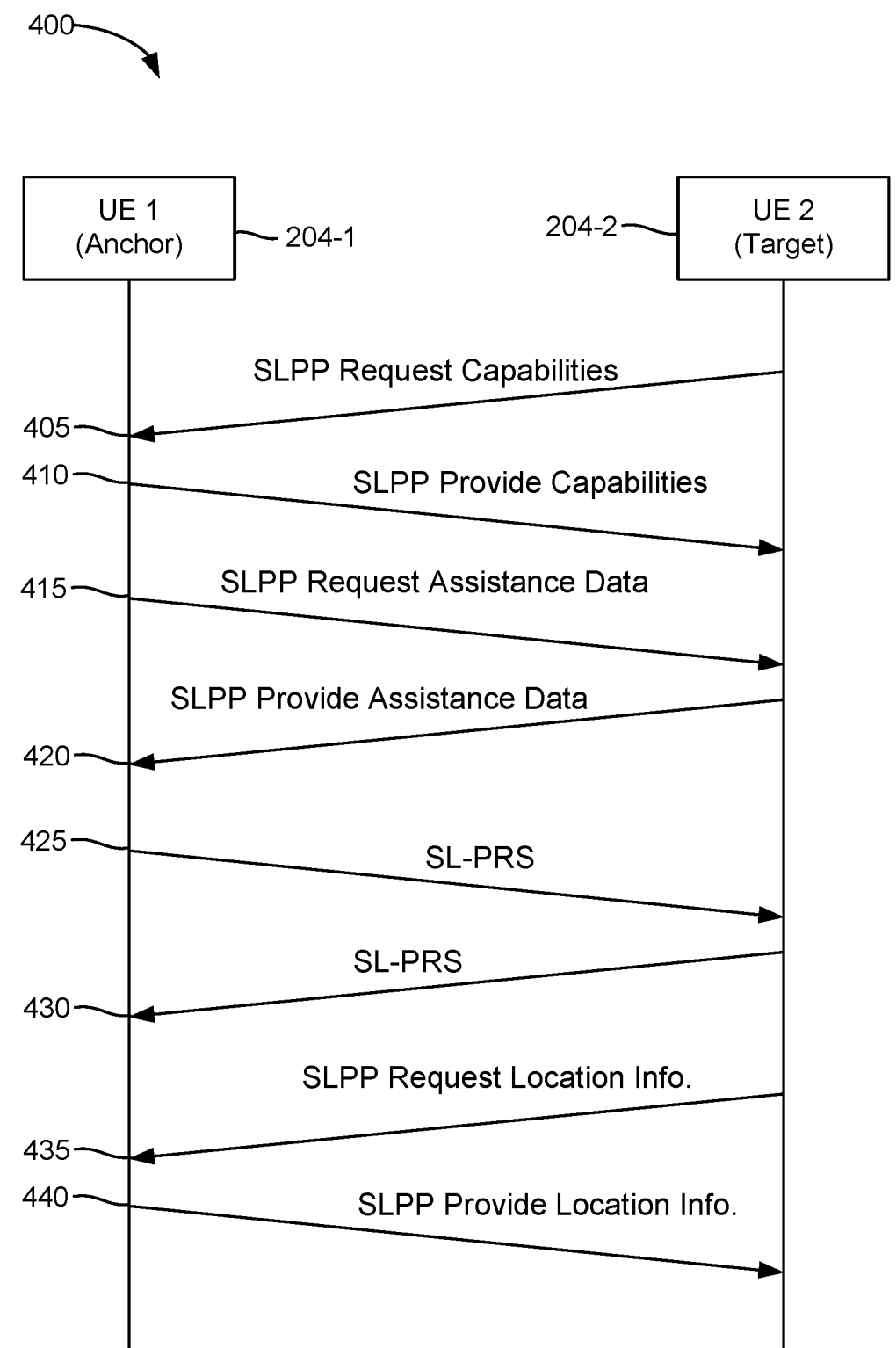
FIG. 4 is a diagram illustrating an example sidelink ranging and positioning procedure, according to aspects of the disclosure.

FIG. 4 illustrates an example sidelink-based ranging and positioning (SLRP) procedure 400, according to aspects of the disclosure. An SLRP procedure 400 is established using the Sidelink Positioning Protocol (SLPP) to identify partici- pating UEs, perform session establishment, and exchange measurements and measurement results. SLPP reuses the basic Long-Term Evolution (LTE) positioning protocol (LPP) message constructs of Request/Provide Capabilities, Request/Provide Assistance Data, and Request/Provide Location Information.

An SLRP procedure 400 (or session) begins with a target UE 204-2 (a UE with an unknown or inaccurate location that is attempting to be located) transmitting, at stage 405, an SLPP Request Capabilities message requesting capability information from one or more peer UEs. As shown in FIG. 4, at least one of the peer UEs, UE 204-1, is capable of being an anchor UE for the SLRP procedure 400. As such, at stage 410, the anchor UE 204-1 responds with an SLPP Provide Capabilities message that includes an indication that it is capable of being an anchor UE for the SLRP procedure 400. The SLPP Provide Capabilities message may also include the location of the anchor UE 204-1, or this may be provided later. Note that while FIG. 4 illustrates the target UE 204-2 initiating the SLPP capabilities exchange procedure by transmitting the SLPP Request Capabilities message, an SLPP capabilities exchange can be initiated by either a target UE 204-2 or an anchor UE 204-1. In the latter case, an anchor UE 204-1 may be, for example, an RSU situated at an intersection periodically polling vehicles to establish a positioning session by transmitting SLPP Request Capabilities messages to the vehicles.

At stage 415, after the initial capability exchange, the anchor UE 204-1 transmits an SLPP Request Assistance Data message to the target UE 204-2. At stage 420, the target UE 204-2 transmits an SLPP Provide Assistance Data message to the anchor UE 204-1, which may include the configuration of one or more SL-PRS resources to be transmitted by the anchor UE 204-1 for measurement by the target UE 204-2 for the SLRP procedure 400. Alternatively or additionally, the SLPP Provide Assistance Data message may include configuration information for one or more SL-PRS resources to be transmitted by the target UE 204-2 for measurement by the anchor UE 204-1. In some cases (not shown), the target UE 204-2 may transmit an SLPP Request Assistance Data message to the anchor UE 204-1 to obtain configuration information for the one or more SL-PRS resources transmitted by the anchor UE 204-1 for measurement by the target UE 204-2. The target UE 204-2 provides the requested configuration information in an SLPP Provide Assistance Data message. In some cases, the respective UE 204 may not transmit an SLPP Request Assistance Data message, but instead, only the SLPP Provide Assistance Data message.

At stages 425 and 430, the involved peer UEs 204 transmit the configured SL-PRS resources to each other. Alternatively, only the anchor UE 204-1 of the target UE 204-2 may transmit SL-PRS resources (e.g., in the case of a sidelink time-difference of arrival (SL-TDOA) procedure). The resources on which the SL-PRS are transmitted may be configured during the assistance data exchange(s) at stages 415 and 420. The anchor UE 204-1 measures the reception-to-transmission (Rx-Tx) time difference between the transmission time of the SL-PRS resource(s) at stage 425 and the reception time of the SL-PRS resource(s) at stage 430. Likewise, the target UE 204-2 measures the Rx-Tx time difference between the reception time of the SL-PRS resource(s) at stage 425 and the transmission time of the SL-PRS resource(s) at stage 430. Note that although FIG. 4 illustrates the anchor UE 204-1 transmitting SL-PRS first, the target UE 204-2 may instead transmit SL-PRS first as may be specified in the SLPP Provide Assistance Data message at stage 420.

At stage 435, the target UE 204-2 transmits an SLPP Request Location Information message to the anchor UE 204-1. At stage 440, the anchor UE 204-1 responds with an SLPP Provide Location Information message that includes the Rx-Tx time difference measurement(s) obtained by the anchor UE 204-1. Alternatively or additionally (not shown), the anchor UE 204-1 may transmit an SLPP Request Location Information message to the target UE 204-2 and the target UE 204-2 may respond with an SLPP Provide Location Information message including the Rx-Tx time difference measurement(s) obtained by the target UE 204-2. If the anchor UE 204-1 has not yet provided its location to the target UE 204-2, it does so at this point.

The target UE 204-2 is then able to determine the RTT between itself and the anchor UE 204-1 based on the Rx-Tx time difference measurements. Based on the RTT measurement and the speed of light, the target UE 204-2 can then estimate the distance (or range) between the two UEs 204.

If the target UE 204-2 also has the absolute location (e.g., geographic coordinates) of the anchor UE 204-1 and two or more additional anchor UEs 204-1, the target UE 204-2 can use that location and the distance to the anchor UEs 204-1 to determine its own absolute location (e.g., based on trilateration).

Note that while FIG. 4 illustrates one anchor UE 204-1, a target UE 204-2 may perform, or attempt to perform, the SLRP procedure 400 with multiple anchor UEs 204-1. Further, while FIG. 4 illustrates the SLPP Request Location Information being transmitted after the SL-PRS resources are transmitted, it may be transmitted before SL-PRS transmission.

Sidelink communication, including the exchange of SLPP messages illustrated in FIG. 4, takes place in transmission or reception resource pools. In the frequency domain, the minimum resource allocation unit is a sub-channel (e.g., a collection of consecutive PRBs in the frequency domain). In the time domain, resource allocation is in one slot intervals. However, some slots are not available for sidelink, and some slots contain feedback resources. In addition, sidelink resources can be (pre) configured to occupy fewer than 14 symbols of a slot.

Sidelink resources are configured at the radio resource control (RRC) layer. The RRC configuration can be by pre-configuration (e.g., preloaded on the UE) or configuration (e.g., from a serving base station).

Figure 5A:
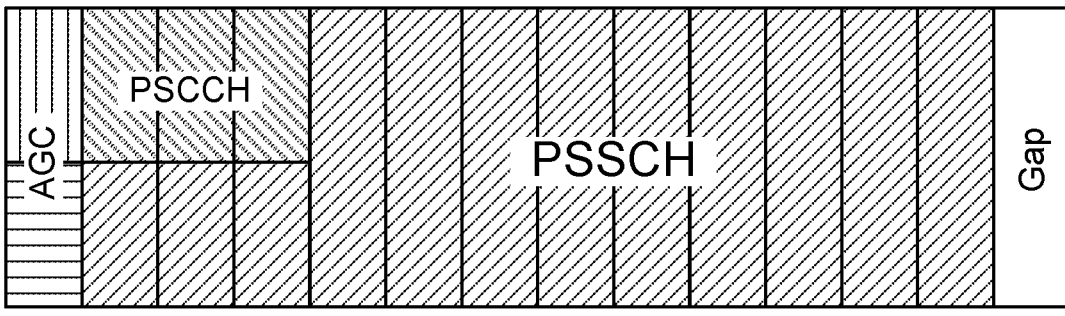
FIGS. 5A and 5B are diagrams of example sidelink slot structures with and without feedback resources, according to aspects of the disclosure.

NR sidelinks support hybrid automatic repeat request (HARQ) retransmission. FIG. 5A is a diagram 500 of an example slot structure without feedback resources, according to aspects of the disclosure. In the example of FIG. 5A, time is represented horizontally and frequency is represented vertically. In the time domain, the length of each block is one orthogonal frequency division multiplexing (OFDM) symbol, and the 14 symbols make up a slot. In the frequency domain, the height of each block is one sub-channel. Currently, the (pre) configured sub-channel size can be selected from the set of {10, 15, 20, 25, 50, 75, 100} physical resource blocks (PRBs).

For a sidelink slot, the first symbol is a repetition of the preceding symbol and is used for automatic gain control (AGC) setting. This is illustrated in FIG. 5A by the vertical and horizontal hashing. As shown in FIG. 5A, for sidelink, the physical sidelink control channel (PSCCH) and the physical sidelink shared channel (PSSCH) are transmitted in the same slot. Similar to the physical downlink control channel (PDCCH), the PSCCH carries control information about sidelink resource allocation and descriptions about sidelink data transmitted to the UE. Likewise, similar to the physical downlink shared channel (PDSCH), the PSSCH carries user data for the UE. In the example of FIG. 5A, the PSCCH occupies half the bandwidth of the sub-channel and only three symbols. Finally, a gap symbol is present after the PSSCH.

Figure 5B:
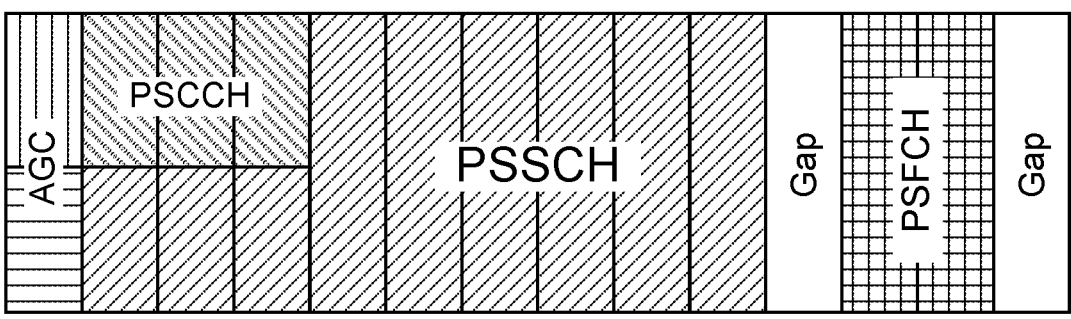

FIG. 5B is a diagram 550 of an example slot structure with feedback resources, according to aspects of the disclosure. In the example of FIG. 5B, time is represented horizontally and frequency is represented vertically. In the time domain, the length of each block is one OFDM symbol, and the 14 symbols make up a slot. In the frequency domain, the height of each block is one sub-channel.

The slot structure illustrated in FIG. 5B is similar to the slot structure illustrated in FIG. 5A, except that the slot structure illustrated in FIG. 5B includes feedback resources. Specifically, two symbols at the end of the slot have been dedicated to the physical sidelink feedback channel (PSFCH). The first PSFCH symbol is a repetition of the second PSFCH symbol for AGC setting. In addition to the gap symbol after the PSSCH, there is a gap symbol after the two PSFCH symbols. Currently, resources for the PSFCH can be configured with a periodicity selected from the set of {0, 1, 2, 4} slots.

Figure 6:
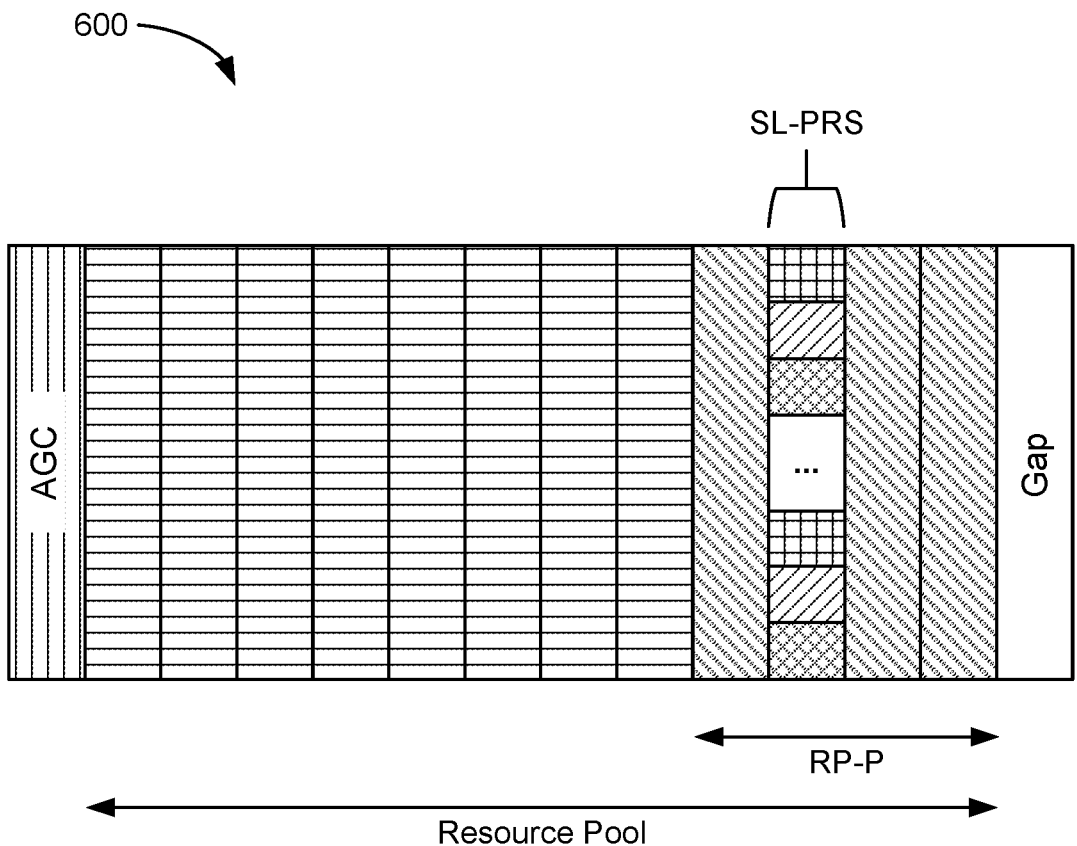
FIG. 6 is a diagram illustrating an example resource pool for positioning, according to aspects of the disclosure.

FIG. 6 is a diagram 600 illustrating an example of a resource pool for positioning configured within a sidelink resource pool for communication (i.e., a shared resource pool), according to aspects of the disclosure. In the example of FIG. 6, time is represented horizontally and frequency is represented vertically. In the time domain, the length of each block is an OFDM symbol, and the 14 symbols make up a slot. In the frequency domain, the height of each block is a sub-channel.

In the example of FIG. 6, the entire slot (except for the first and last symbols) can be a resource pool for sidelink communication. That is, any of the symbols other than the first and last can be allocated for sidelink communication. However, a resource pool for positioning (RP-P) is allocated in the last four pre-gap symbols of the slot. As such, non-sidelink positioning data, such as user data (PSSCH), channel state information reference signal (CSI-RS), and control information, can only be transmitted in the first eight post-automatic gain control (AGC) symbols and not in the last four pre-gap symbols to prevent a collision with the configured RP-P. The non-sidelink positioning data that would otherwise be transmitted in the last four pre-gap symbols can be punctured or muted, or the non-sidelink data that would normally span more than the eight post-AGC symbols can be rate matched to fit into the eight post-AGC symbols.

SL-PRS (e.g., as transmitted at stages 425 and 430 of FIG. 4) have been defined to enable sidelink positioning procedures among UEs. Like a downlink positioning reference signal (DL-PRS), a SL-PRS resource is composed of one or more resource elements (i.e., one OFDM symbol in the time domain and one subcarrier in the frequency domain). SL-PRS resources have been designed with a comb-based pattern to enable fast Fourier transform (FFT)-based processing at the receiver. SL-PRS resources are composed of unstaggered, or only partially staggered, resource elements in the frequency domain to provide small time of arrival (TOA) uncertainty and reduced overhead of each SL-PRS resource. SL-PRS may also be associated with specific RP-Ps (e.g., certain SL-PRS may be allocated in certain RP-Ps). SL-PRS have also been defined with intra-slot repetition (not shown in FIG. 6) to allow for combining gains (if needed). There may also be inter-UE coordination of RP-Ps to provide for dynamic SL-PRS and data multiplexing while minimizing SL-PRS collisions.

Sidelink positioning-capable UEs generally support several types of transmissions: (1) sidelink data not associated with a sidelink positioning session (e.g., V2X messages), (2) uplink data (data over a Uu link), (3) SL-PRS, and (4) SLPP messages. To address conflicts between sidelink data transmission and uplink data transmission (i.e., where both sidelink data and uplink data are scheduled to be transmitted in the same slot), mechanisms have been defined for a UE to prioritize transmission of sidelink and uplink data based on both the sidelink data and uplink data being assigned one of eight priority levels. That is, the UE transmits whichever of the sidelink data or the uplink data has been assigned a higher priority level.

Eight priority levels have also been introduced for SL-PRS transmission. The SL-PRS priority level may be provided by the transmitting UE's own higher layer (e.g., RRC layer) when it triggers the SL-PRS transmission. However, no separate priority levels have been assigned to SLPP messages, nor has it been determined how SLPP messages should be treated when SL-PRS is prioritized or deprioritized. As such, there may be scenarios where a UE is engaged in a sidelink positioning session (e.g., SLRP procedure 400) and also has uplink data to transmit. The UE may transmit SL-PRS (as at stages 425 or 430) for the sidelink positioning session due to the SL-PRS having a higher priority than the uplink data, but may not be able transmit the subsequent SLPP message (e.g., as at stage 435 or 440) because of the uplink data to be transmitted and the SLPP message having no priority compared to the uplink data.

Accordingly, the present disclosure provides techniques (or rules or heuristics) for a UE to prioritize SLPP messages based on the prioritization of SL-PRS relative to sidelink data and/or uplink data. In contrast to existing uplink and sidelink prioritization, a UE incorporates prioritization exercised earlier in time for SL-PRS in order to determine priority for SLPP messages.

Figure 7:
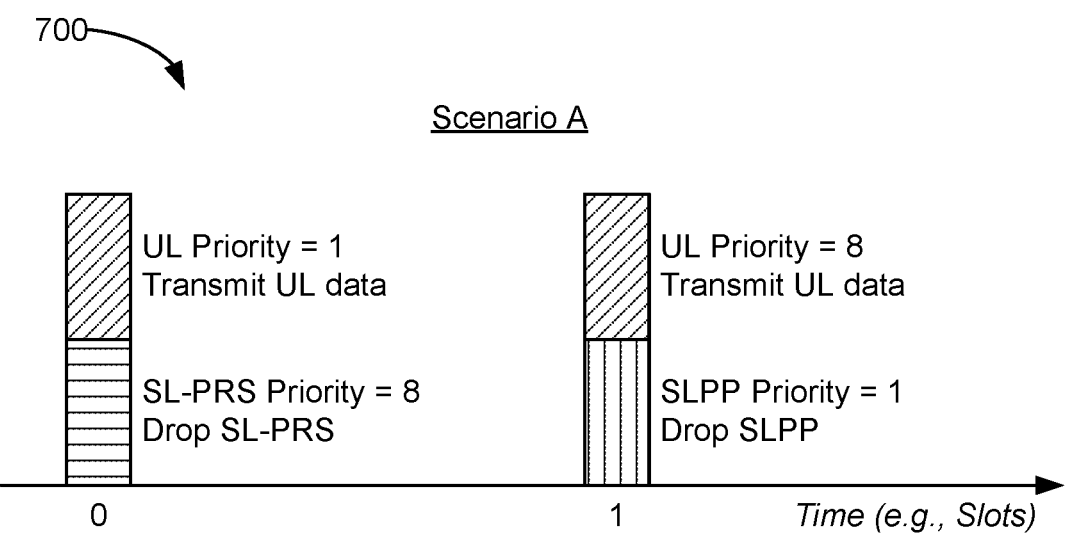
FIG. 7 illustrates an example of sidelink positioning protocol (SLPP) priority following sidelink positioning reference signal (SL-PRS) priority, according to aspects of the disclosure.
Figure 7:
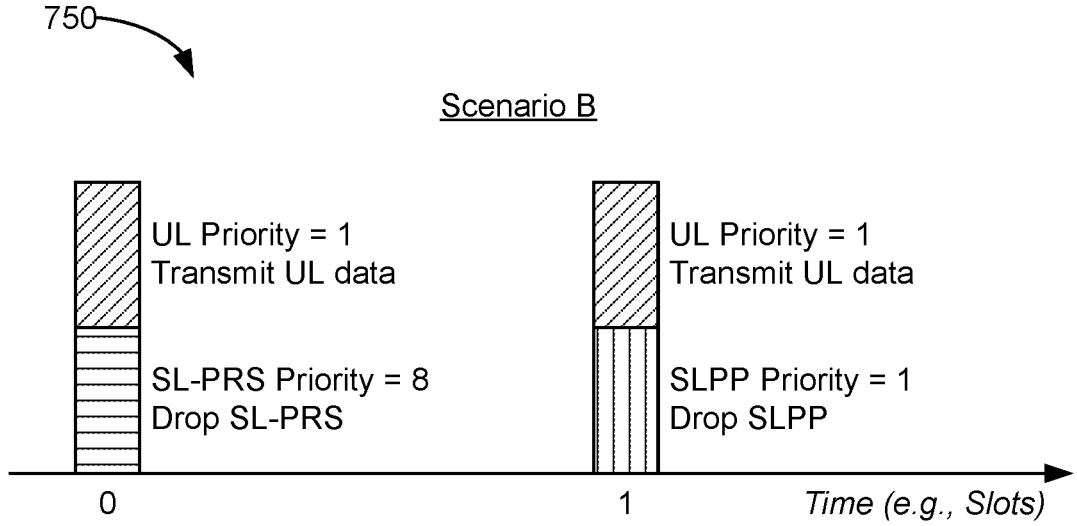

As a first technique, the priority assigned to SLPP data may follow the priority assigned to a SL-PRS transmission. FIG. 7 illustrates an example of SLPP priority following SL-PRS priority, according to aspects of the disclosure. In each scenario illustrated in FIG. 7, uplink (UL) data and SL-PRS are scheduled in a first transmission opportunity (e.g., slot "0") and uplink data and SLPP data (e.g., an SLPP message or a portion of an SLPP message) are scheduled in a second transmission opportunity (e.g., slot "1"). Note that although the first and second transmission opportunities are numbered as consecutive transmission opportunities, they need not be. Further, while the transmission opportunities are illustrated as slots, they may instead be symbols, subframes, frames, or other type of transmission opportunity. The SLPP data scheduled in the second transmission opportunity may be a (or part of a) SLPP message that depends on the transmission of the SL-PRS in the first transmission opportunity, such as a SLPP Request Location Information message or a SLPP Provide Location Information message.

In the first scenario (labeled "Scenario A") shown by diagram 700, in slot "0," uplink data transmission has a higher priority (e.g., UL Priority=1) than SL-PRS transmission (e.g., SL-PRS Priority=8). In this case, the uplink data is transmitted and the SL-PRS is dropped (i.e., not transmitted). In slot "1," the uplink data transmission has a lower priority (e.g., UL Priority=8) than the SLPP transmission (SLPP priority=1). However, the transmission of the SLPP message is of no value as the SL-PRS in the previous transmission opportunity (e.g., slot) was dropped. In this case, the default prioritization is overridden. As such, the uplink data is transmitted and the SLPP data (or portion thereof) is dropped.

Similarly, for the second scenario (labeled "Scenario B") shown by diagram 750, when the uplink data and SLPP data have equal priority, the SLPP data is dropped based on the SL-PRS transmission having been dropped in the prior transmission opportunity (e.g., slot). In these examples, the UE maintains a history and state of prior transmissions to determine if SLPP data should be transmitted, which is in contrast to the currently defined memoryless sidelink and uplink prioritization rules. As such, the UE can override the default uplink and sidelink transmission prioritization based on the priority level of the SL-PRS.

Figure 8:
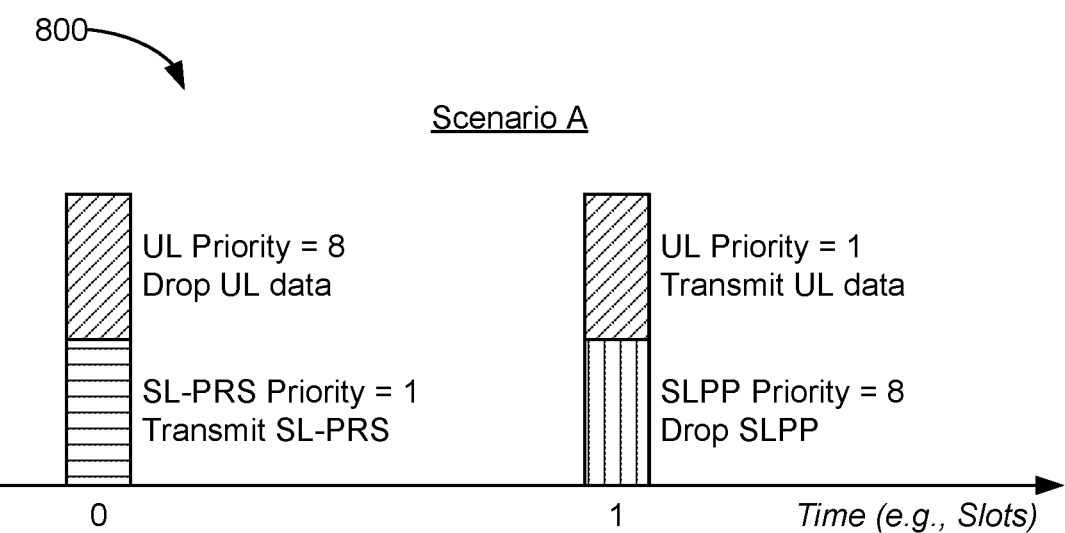
FIG. 8 illustrates an example of SLPP priority following uplink data priority, according to aspects of the disclosure.
Figure 8:
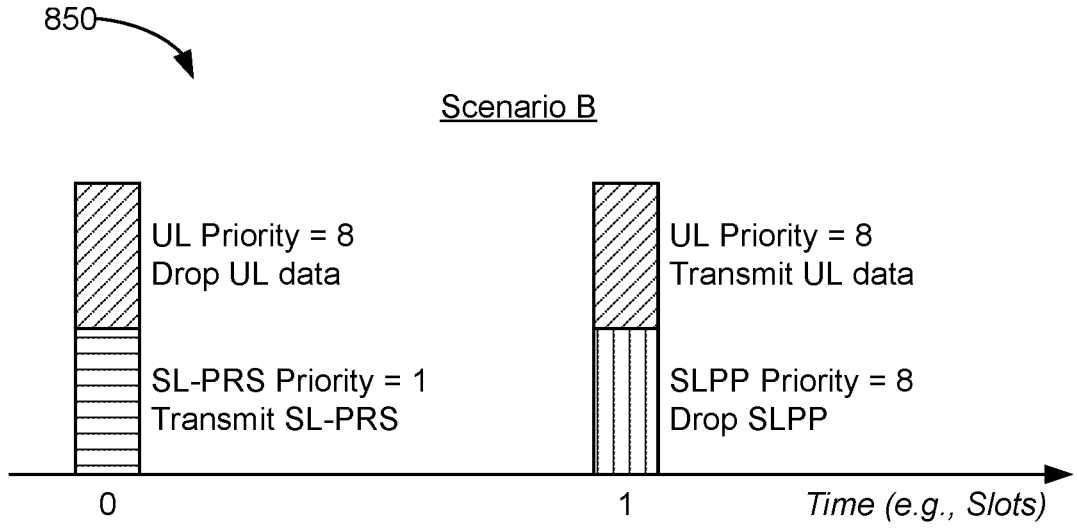

As a second technique, the priority assigned to SLPP data may follow the priority assigned to uplink data transmission. FIG. 8 illustrates an example of SLPP priority following uplink data priority, according to aspects of the disclosure.

In each scenario illustrated in FIG. 8, uplink (UL) data and SL-PRS are scheduled in a first transmission opportunity (e.g., slot "0") and uplink data and SLPP data (e.g., an SLPP message or a portion of an SLPP message) are scheduled in a second transmission opportunity (e.g., slot "1"). Note that although the first and second transmission opportunities are numbered as consecutive transmission opportunities, they need not be. Further, while the transmission opportunities are illustrated as slots, they may instead be symbols, subframes, frames, or other type of transmission opportunity. The SLPP data scheduled in the second transmission opportunity may be a (or part of a) SLPP Request Location Information message or a SLPP Provide Location Information message that depends on the transmission of the SL-PRS in the first transmission opportunity.

In the first scenario (labeled "Scenario A") shown by diagram 800, in slot "0," uplink data transmission has a lower priority (e.g., UL Priority=8) than SL-PRS transmission (e.g., SL-PRS Priority=1). As such, the uplink data is dropped and the SL-PRS is transmitted (e.g., as at stage 425 or 430). In slot "1," the uplink data transmission has a higher priority (e.g., UL Priority=1) than the SLPP transmission (SLPP priority=8). In this case, the UE follows the default uplink and sidelink prioritization by transmitting the uplink data and dropping (i.e., refraining from transmitting) the SLPP data. The default behavior is to then terminate the SLPP session. However, the UE may instead maintain the SLPP session and transmit the SLPP data/message at a future opportunity (e.g., where the SLPP data has a higher priority than the uplink data).

Similarly, for the second scenario (labeled "Scenario B") shown by diagram 850, when the uplink data and SLPP data have equal priority, the SLPP data is dropped based on the default uplink and sidelink prioritization rules. Again, for these scenarios, the UE maintains a history and state of prior transmissions to determine if SLPP data should be transmitted.

Figure 9:
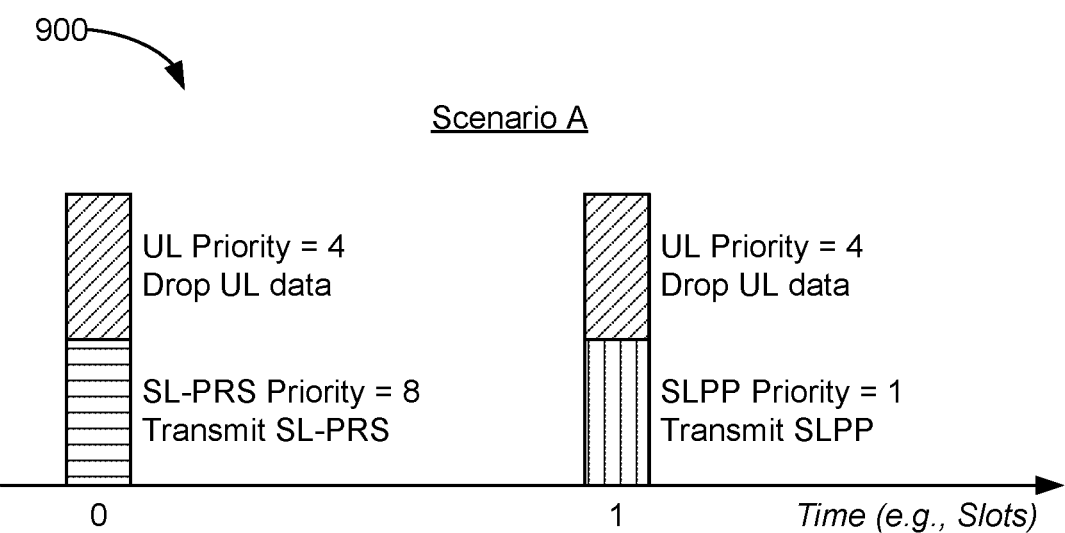
FIG. 9 illustrates an example of SLPP priority following sidelink positioning session priority, according to aspects of the disclosure.
Figure 9:
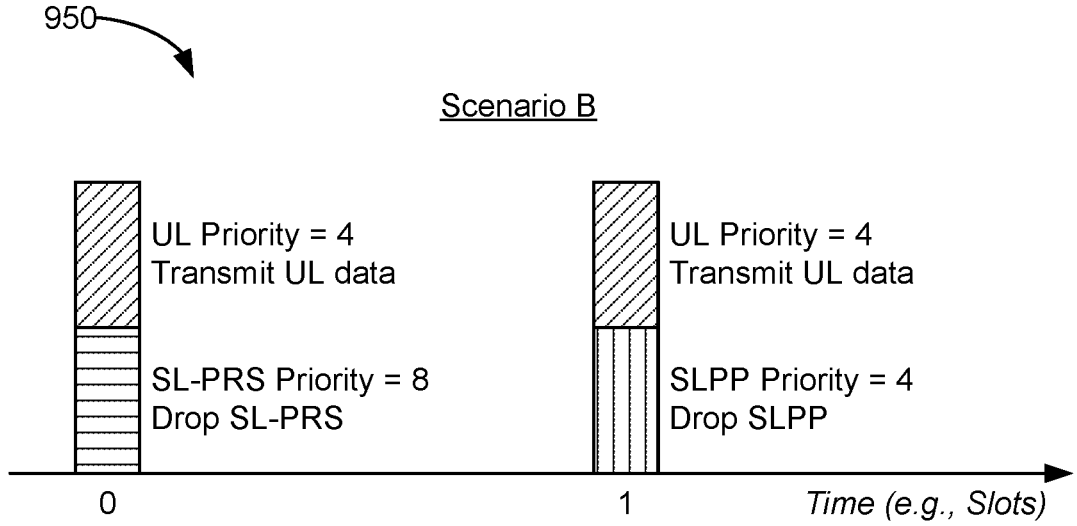

As a third technique, the priority assigned to the SLPP data based on the priority of the sidelink positioning session. FIG. 9 illustrates an example of SLPP priority following sidelink positioning session priority, according to aspects of the disclosure. In each scenario illustrated in FIG. 9, uplink (UL) data and SL-PRS are scheduled in a first transmission opportunity (e.g., slot "0") and uplink data and SLPP data (e.g., an SLPP message or a portion of an SLPP message) are scheduled in a second transmission opportunity (e.g., slot "1"). Note that although the first and second transmission opportunities are numbered as consecutive transmission opportunities, they need not be. Further, while the transmission opportunities are illustrated as slots, they may instead be symbols, subframes, frames, or other type of transmission opportunity. The SLPP data scheduled in the second transmission opportunity may be a (or part of a) SLPP Request Location Information message or a SLPP Provide Location Information message that depends on the transmission of the SL-PRS in the first transmission opportunity.

In the first scenario (labeled "Scenario A") shown by diagram 900, in slot "0," uplink data transmission has a higher priority (e.g., UL Priority=4) than SL-PRS transmission (e.g., SL-PRS Priority=8). In slot "1," the uplink data transmission has a lower priority (e.g., UL Priority=4) than the SLPP transmission (SLPP priority=1). Based on the priority of the sidelink positioning session being higher than the priority of the uplink data (as indicated by the SLPP priority being greater than the uplink priority), the default prioritization is overridden and the SL-PRS is transmitted in slot "0" and the uplink data is dropped.

Similarly, for the second scenario (labeled "Scenario B") shown by diagram 950, when the uplink data and the sidelink positioning procedure have equal priority, the SLPP data is dropped based on having dropped the SL-PRS in slot "0." That is, in the case of the uplink data and sidelink data having the same priority, the uplink data is transmitted. Thus, in this case, the UE looks ahead to the SLPP transmission(s) associated with the SL-PRS transmission(s) to determine whether the SLPP data should be transmitted. In this case, the UE can override the default uplink and sidelink transmission prioritization based on the SL-PRS priority.

FIG. 10 illustrates an example method 1000 of wireless communication, according to aspects of the disclosure. In an aspect, method 1000 may be performed by a UE (e.g., any of the UEs described herein).

At 1010, the UE transmits first non-positioning data (e.g., uplink data or sidelink data) in a first-occurring transmission opportunity (e.g., a symbol, a slot) of a plurality of transmission opportunities based on the first non-positioning data having a higher priority than a SL-PRS scheduled to be transmitted in the first-occurring transmission opportunity. In an aspect, operation 1010 may be performed by the one or more WWAN transceivers 310, the one or more short-range wireless transceivers 320, the one or more processors 342, memory 340, and/or sidelink component 348, any or all of which may be considered means for performing this operation.

At 1020, the UE transmits second non-positioning data (e.g., uplink data or sidelink data) in a second-occurring transmission opportunity (e.g., a symbol, a slot) of the plurality of transmission opportunities, wherein the second non-positioning data has a lower priority than SLPP data (e.g., at least a portion of a SLPP Request Location Information message or a SLPP Provide Location Information message) scheduled to be transmitted in the second-occurring transmission opportunity, and wherein the second non-positioning data is transmitted in the second-occurring transmission opportunity instead of the SLPP data scheduled to be transmitted in the second-occurring transmission opportunity based on the SLPP data being associated with the SL-PRS. In an aspect, operation 1020 may be performed by the one or more WWAN transceivers 310, the one or more short-range wireless transceivers 320, the one or more processors 342, memory 340, and/or sidelink component 348, any or all of which may be considered means for performing this operation.

FIG. 11 illustrates an example method 1100 of wireless communication, according to aspects of the disclosure. In an aspect, method 1100 may be performed by a UE (e.g., any of the UEs described herein).

At 1110, the UE transmits a SL-PRS in a first-occurring transmission opportunity (e.g., a symbol, a slot) of a plurality of transmission opportunities, wherein the SL-PRS has a lower priority than first non-positioning data (e.g., uplink data or sidelink data) scheduled to be transmitted in the first-occurring transmission opportunity, and wherein the SL-PRS is transmitted in the first-occurring transmission opportunity based on a priority of SLPP data (e.g., at least a portion of a SLPP Request Location Information message or a SLPP Provide Location Information message) associated with the SL-PRS to be transmitted in a second-occurring transmission opportunity (e.g., a symbol, a slot) of the plurality of transmission opportunities having a higher priority than second non-positioning data (e.g., uplink data or sidelink data) scheduled to be transmitted in the second-occurring transmission opportunity. In an aspect, operation 1110 may be performed by the one or more WWAN transceivers 310, the one or more short-range wireless transceivers 320, the one or more processors 342, memory 340, and/or sidelink component 348, any or all of which may be considered means for performing this operation.

At 1120, the UE transmits the SLPP data in the second-occurring transmission opportunity. In an aspect, operation 1120 may be performed by the one or more WWAN transceivers 310, the one or more short-range wireless transceivers 320, the one or more processors 342, memory 340, and/or sidelink component 348, any or all of which may be considered means for performing this operation.

FIG. 12 illustrates an example method 1200 of wireless communication, according to aspects of the disclosure. In an aspect, method 1200 may be performed by a UE (e.g., any of the UEs described herein).

At 1210, the UE transmits first non-positioning data (e.g., uplink data or sidelink data) in a first-occurring transmission opportunity (e.g., a symbol, a slot) of a plurality of transmission opportunities, wherein the first non-positioning data has a lower priority than a SL-PRS scheduled to be transmitted in the first-occurring transmission opportunity, and wherein the first non-positioning data is transmitted in the first-occurring transmission opportunity based on a priority of SLPP data (e.g., at least a portion of a SLPP Request Location Information message or a SLPP Provide Location Information message) associated with the SL-PRS to be transmitted in a second-occurring transmission opportunity (e.g., a symbol, a slot) of the plurality of transmission opportunities having a lower priority than second non-positioning data (e.g., uplink data or sidelink data) scheduled to be transmitted in the second-occurring transmission opportunity. In an aspect, operation 1210 may be performed by the one or more WWAN transceivers 310, the one or more short-range wireless transceivers 320, the one or more processors 342, memory 340, and/or sidelink component 348, any or all of which may be considered means for performing this operation.

At 1220, the UE transmits the second non-positioning data in the second-occurring transmission opportunity. In an aspect, operation 1220 may be performed by the one or more WWAN transceivers 310, the one or more short-range wireless transceivers 320, the one or more processors 342, memory 340, and/or sidelink component 348, any or all of which may be considered means for performing this operation.

As will be appreciated, a technical advantage of the methods 1000-1200 is enabling a UE to prioritize or drop non-positioning data or SLPP data based on the prioritization of SL-PRS relative to non-positioning data at a given transmission instance and/or based on the prioritization of the SL-PRS relative to non-positioning data incorporating the prioritization of the SLPP data relative to the non-positioning data at a subsequent transmission instance.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: transmitting first non-positioning data in a first-occurring transmission opportunity of a plurality of transmission opportunities based on the first non-positioning data having a higher priority than a sidelink positioning reference signal (SL-PRS) scheduled to be transmitted in the first-occurring transmission opportunity; and transmitting second non-positioning data in a second-occurring transmission opportunity of the plurality of transmission opportunities, wherein the second non-positioning data has a lower priority than sidelink positioning protocol (SLPP) data scheduled to be transmitted in the second-occurring transmission opportunity, and wherein the second non-positioning data is transmitted in the second-occurring transmission opportunity instead of the SLPP data scheduled to be transmitted in the second-occurring transmission opportunity based on the SLPP data being associated with the SL-PRS.

Clause 2. The method of clause 1, further comprising: transmitting the SLPP data in a third-occurring transmission opportunity based on the SLPP data having a higher priority than third non-positioning data scheduled to be transmitted in the third-occurring transmission opportunity.

Clause 3. The method of clause 2, wherein the third-occurring transmission opportunity is the next transmission opportunity after the second-occurring transmission opportunity in which the SLPP data has a higher priority than non-positioning data.

Clause 4. The method of any of clauses 1 to 3, wherein the plurality of transmission opportunities is: a plurality of symbols of a slot, or a plurality of slots.

Clause 5. The method of any of clauses 1 to 4, wherein the first-occurring transmission opportunity and the second-occurring transmission opportunity are consecutive transmission opportunities.

Clause 6. The method of any of clauses 1 to 4, wherein the first-occurring transmission opportunity and the second-occurring transmission opportunity are separated by one or more transmission opportunities during which no data is scheduled to be transmitted.

Clause 7. The method of any of clauses 1 to 6, wherein: the first non-positioning data is first uplink data or first sidelink data, and the second non-positioning data is second uplink data or second sidelink data.

Clause 8. The method of any of clauses 1 to 7, wherein the SLPP data is at least a portion of: a SLPP Request Location Information message associated with the SL-PRS, or a SLPP Provide Location Information message associated with the SL-PRS.

Clause 9. The method of any of clauses 1 to 8, wherein: a priority of the SLPP data is one of eight levels of priority, and a priority of the SL-PRS is one of eight levels of priority.

Clause 10. A method of wireless communication performed by a user equipment (UE), comprising: transmitting a sidelink positioning reference signal (SL-PRS) in a first-occurring transmission opportunity of a plurality of transmission opportunities, wherein the SL-PRS has a lower priority than first non-positioning data scheduled to be transmitted in the first-occurring transmission opportunity, and wherein the SL-PRS is transmitted in the first-occurring transmission opportunity based on a priority of sidelink positioning protocol (SLPP) data associated with the SL-PRS to be transmitted in a second-occurring transmission opportunity of the plurality of transmission opportunities having a higher priority than second non-positioning data scheduled to be transmitted in the second-occurring transmission opportunity; and transmitting the SLPP data in the second-occurring transmission opportunity.

Clause 11. The method of clause 10, wherein the plurality of transmission opportunities is: a plurality of symbols of a slot, or a plurality of slots.

Clause 12. The method of any of clauses 10 to 11, wherein the first-occurring transmission opportunity and the second-occurring transmission opportunity are consecutive transmission opportunities.

Clause 13. The method of any of clauses 10 to 11, wherein the first-occurring transmission opportunity and the second-occurring transmission opportunity are separated by one or more transmission opportunities during which no data is scheduled to be transmitted.

Clause 14. The method of any of clauses 10 to 13, wherein: the first non-positioning data is first uplink data or first sidelink data, and the second non-positioning data is second uplink data or second sidelink data.

Clause 15. The method of any of clauses 10 to 14, wherein the SLPP data is at least a portion of: a SLPP Request Location Information message associated with the SL-PRS, or a SLPP Provide Location Information message associated with the SL-PRS.

Clause 16. The method of any of clauses 10 to 15, wherein: a priority of the SLPP data is one of eight levels of priority, and a priority of the SL-PRS is one of eight levels of priority.

Clause 17. A method of wireless communication performed by a user equipment (UE), comprising: transmitting first non-positioning data in a first-occurring transmission opportunity of a plurality of transmission opportunities, wherein the first non-positioning data has a lower priority than a sidelink positioning reference signal (SL-PRS) scheduled to be transmitted in the first-occurring transmission opportunity, and wherein the first non-positioning data is transmitted in the first-occurring transmission opportunity based on a priority of sidelink positioning protocol (SLPP) data associated with the SL-PRS to be transmitted in a second-occurring transmission opportunity of the plurality of transmission opportunities having a lower priority than second non-positioning data scheduled to be transmitted in the second-occurring transmission opportunity; and transmitting the second non-positioning data in the second-occurring transmission opportunity.

Clause 18. The method of clause 17, wherein the plurality of transmission opportunities is: a plurality of symbols of a slot, or a plurality of slots.

Clause 19. The method of any of clauses 17 to 18, wherein the first-occurring transmission opportunity and the second-occurring transmission opportunity are consecutive transmission opportunities.

Clause 20. The method of any of clauses 17 to 18, wherein the first-occurring transmission opportunity and the second-occurring transmission opportunity are separated by one or more transmission opportunities during which no data is scheduled to be transmitted.

Clause 21. The method of any of clauses 17 to 20, wherein: the first non-positioning data is first uplink data or first sidelink data, and the second non-positioning data is second uplink data or second sidelink data.

Clause 22. The method of any of clauses 17 to 21, wherein the SLPP data is at least a portion of: a SLPP Request Location Information message associated with the SL-PRS, or a SLPP Provide Location Information message associated with the SL-PRS.

Clause 23. The method of any of clauses 17 to 22, wherein: a priority of the SLPP data is one of eight levels of priority, and a priority of the SL-PRS is one of eight levels of priority.

Clause 24. A user equipment (UE), comprising: one or more memories; one or more transceivers; and one or more processors communicatively coupled to the one or more memories and the one or more transceivers, the one or more processors, either alone or in combination, configured to: transmit, via the one or more transceivers, first non-positioning data in a first-occurring transmission opportunity of a plurality of transmission opportunities based on the first non-positioning data having a higher priority than a sidelink positioning reference signal (SL-PRS) scheduled to be transmitted in the first-occurring transmission opportunity; and transmit, via the one or more transceivers, second non-positioning data in a second-occurring transmission opportunity of the plurality of transmission opportunities, wherein the second non-positioning data has a lower priority than sidelink positioning protocol (SLPP) data scheduled to be transmitted in the second-occurring transmission opportunity, and wherein the second non-positioning data is transmitted in the second-occurring transmission opportunity instead of the SLPP data scheduled to be transmitted in the second-occurring transmission opportunity based on the SLPP data being associated with the SL-PRS.

Clause 25. The UE of clause 24, wherein the one or more processors, either alone or in combination, are further configured to: transmit, via the one or more transceivers, the SLPP data in a third-occurring transmission opportunity based on the SLPP data having a higher priority than third non-positioning data scheduled to be transmitted in the third-occurring transmission opportunity.

Clause 26. The UE of clause 25, wherein the third-occurring transmission opportunity is the next transmission opportunity after the second-occurring transmission opportunity in which the SLPP data has a higher priority than non-positioning data.

Clause 27. The UE of any of clauses 24 to 26, wherein the plurality of transmission opportunities is: a plurality of symbols of a slot, or a plurality of slots.

Clause 28. The UE of any of clauses 24 to 27, wherein the first-occurring transmission opportunity and the second-occurring transmission opportunity are consecutive transmission opportunities.

Clause 29. The UE of any of clauses 24 to 27, wherein the first-occurring transmission opportunity and the second-occurring transmission opportunity are separated by one or more transmission opportunities during which no data is scheduled to be transmitted.

Clause 30. The UE of any of clauses 24 to 29, wherein: the first non-positioning data is first uplink data or first sidelink data, and the second non-positioning data is second uplink data or second sidelink data.

Clause 31. The UE of any of clauses 24 to 30, wherein the SLPP data is at least a portion of: a SLPP Request Location Information message associated with the SL-PRS, or a SLPP Provide Location Information message associated with the SL-PRS.

Clause 32. The UE of any of clauses 24 to 31, wherein: a priority of the SLPP data is one of eight levels of priority, and a priority of the SL-PRS is one of eight levels of priority.

Clause 33. A user equipment (UE), comprising: one or more memories; one or more transceivers; and one or more processors communicatively coupled to the one or more memories and the one or more transceivers, the one or more processors, either alone or in combination, configured to: transmit, via the one or more transceivers, a sidelink positioning reference signal (SL-PRS) in a first-occurring transmission opportunity of a plurality of transmission opportunities, wherein the SL-PRS has a lower priority than first non-positioning data scheduled to be transmitted in the first-occurring transmission opportunity, and wherein the SL-PRS is transmitted in the first-occurring transmission opportunity based on a priority of sidelink positioning protocol (SLPP) data associated with the SL-PRS to be transmitted in a second-occurring transmission opportunity of the plurality of transmission opportunities having a higher priority than second non-positioning data scheduled to be transmitted in the second-occurring transmission opportunity; and transmit, via the one or more transceivers, the SLPP data in the second-occurring transmission opportunity.

Clause 34. The UE of clause 33, wherein the plurality of transmission opportunities is: a plurality of symbols of a slot, or a plurality of slots.

Clause 35. The UE of any of clauses 33 to 34, wherein the first-occurring transmission opportunity and the second-occurring transmission opportunity are consecutive transmission opportunities.

Clause 36. The UE of any of clauses 33 to 34, wherein the first-occurring transmission opportunity and the second-occurring transmission opportunity are separated by one or more transmission opportunities during which no data is scheduled to be transmitted.

Clause 37. The UE of any of clauses 33 to 36, wherein: the first non-positioning data is first uplink data or first sidelink data, and the second non-positioning data is second uplink data or second sidelink data.

Clause 38. The UE of any of clauses 33 to 37, wherein the SLPP data is at least a portion of: a SLPP Request Location Information message associated with the SL-PRS, or a SLPP Provide Location Information message associated with the SL-PRS.

Clause 39. The UE of any of clauses 33 to 38, wherein: a priority of the SLPP data is one of eight levels of priority, and a priority of the SL-PRS is one of eight levels of priority.

Clause 40. A user equipment (UE), comprising: one or more memories; one or more transceivers; and one or more processors communicatively coupled to the one or more memories and the one or more transceivers, the one or more processors, either alone or in combination, configured to: transmit, via the one or more transceivers, first non-positioning data in a first-occurring transmission opportunity of a plurality of transmission opportunities, wherein the first non-positioning data has a lower priority than a sidelink positioning reference signal (SL-PRS) scheduled to be transmitted in the first-occurring transmission opportunity, and wherein the first non-positioning data is transmitted in the first-occurring transmission opportunity based on a priority of sidelink positioning protocol (SLPP) data associated with the SL-PRS to be transmitted in a second-occurring transmission opportunity of the plurality of transmission opportunities having a lower priority than second non-positioning data scheduled to be transmitted in the second-occurring transmission opportunity; and transmit, via the one or more transceivers, the second non-positioning data in the second-occurring transmission opportunity.

Clause 41. The UE of clause 40, wherein the plurality of transmission opportunities is: a plurality of symbols of a slot, or a plurality of slots.

Clause 42. The UE of any of clauses 40 to 41, wherein the first-occurring transmission opportunity and the second-occurring transmission opportunity are consecutive transmission opportunities.

Clause 43. The UE of any of clauses 40 to 41, wherein the first-occurring transmission opportunity and the second-occurring transmission opportunity are separated by one or more transmission opportunities during which no data is scheduled to be transmitted.

Clause 44. The UE of any of clauses 40 to 43, wherein: the first non-positioning data is first uplink data or first sidelink data, and the second non-positioning data is second uplink data or second sidelink data.

Clause 45. The UE of any of clauses 40 to 44, wherein the SLPP data is at least a portion of: a SLPP Request Location Information message associated with the SL-PRS, or a SLPP Provide Location Information message associated with the SL-PRS.

Clause 46. The UE of any of clauses 40 to 45, wherein: a priority of the SLPP data is one of eight levels of priority, and a priority of the SL-PRS is one of eight levels of priority.

Clause 47. A user equipment (UE), comprising: means for transmitting first non-positioning data in a first-occurring transmission opportunity of a plurality of transmission opportunities based on the first non-positioning data having a higher priority than a sidelink positioning reference signal (SL-PRS) scheduled to be transmitted in the first-occurring transmission opportunity; and means for transmitting second non-positioning data in a second-occurring transmission opportunity of the plurality of transmission opportunities, wherein the second non-positioning data has a lower priority than sidelink positioning protocol (SLPP) data scheduled to be transmitted in the second-occurring transmission opportunity, and wherein the second non-positioning data is transmitted in the second-occurring transmission opportunity instead of the SLPP data scheduled to be transmitted in the second-occurring transmission opportunity based on the SLPP data being associated with the SL-PRS.

Clause 48. The UE of clause 47, further comprising: means for transmitting the SLPP data in a third-occurring transmission opportunity based on the SLPP data having a higher priority than third non-positioning data scheduled to be transmitted in the third-occurring transmission opportunity.

Clause 49. The UE of clause 48, wherein the third-occurring transmission opportunity is the next transmission opportunity after the second-occurring transmission opportunity in which the SLPP data has a higher priority than non-positioning data.

Clause 50. The UE of any of clauses 47 to 49, wherein the plurality of transmission opportunities is: a plurality of symbols of a slot, or a plurality of slots.

Clause 51. The UE of any of clauses 47 to 50, wherein the first-occurring transmission opportunity and the second-occurring transmission opportunity are consecutive transmission opportunities.

Clause 52. The UE of any of clauses 47 to 50, wherein the first-occurring transmission opportunity and the second-occurring transmission opportunity are separated by one or more transmission opportunities during which no data is scheduled to be transmitted.

Clause 53. The UE of any of clauses 47 to 52, wherein: the first non-positioning data is first uplink data or first sidelink data, and the second non-positioning data is second uplink data or second sidelink data.

Clause 54. The UE of any of clauses 47 to 53, wherein the SLPP data is at least a portion of: a SLPP Request Location Information message associated with the SL-PRS, or a SLPP Provide Location Information message associated with the SL-PRS.

Clause 55. The UE of any of clauses 47 to 54, wherein: a priority of the SLPP data is one of eight levels of priority, and a priority of the SL-PRS is one of eight levels of priority.

Clause 56. A user equipment (UE), comprising: means for transmitting a sidelink positioning reference signal (SL-PRS) in a first-occurring transmission opportunity of a plurality of transmission opportunities, wherein the SL-PRS has a lower priority than first non-positioning data scheduled to be transmitted in the first-occurring transmission opportunity, and wherein the SL-PRS is transmitted in the first-occurring transmission opportunity based on a priority of sidelink positioning protocol (SLPP) data associated with the SL-PRS to be transmitted in a second-occurring transmission opportunity of the plurality of transmission opportunities having a higher priority than second non-positioning data scheduled to be transmitted in the second-occurring transmission opportunity; and means for transmitting the SLPP data in the second-occurring transmission opportunity.

Clause 57. The UE of clause 56, wherein the plurality of transmission opportunities is: a plurality of symbols of a slot, or a plurality of slots.

Clause 58. The UE of any of clauses 56 to 57, wherein the first-occurring transmission opportunity and the second-occurring transmission opportunity are consecutive transmission opportunities.

Clause 59. The UE of any of clauses 56 to 57, wherein the first-occurring transmission opportunity and the second-occurring transmission opportunity are separated by one or more transmission opportunities during which no data is scheduled to be transmitted.

Clause 60. The UE of any of clauses 56 to 59, wherein: the first non-positioning data is first uplink data or first sidelink data, and the second non-positioning data is second uplink data or second sidelink data.

Clause 61. The UE of any of clauses 56 to 60, wherein the SLPP data is at least a portion of: a SLPP Request Location Information message associated with the SL-PRS, or a SLPP Provide Location Information message associated with the SL-PRS.

Clause 62. The UE of any of clauses 56 to 61, wherein: a priority of the SLPP data is one of eight levels of priority, and a priority of the SL-PRS is one of eight levels of priority.

Clause 63. A user equipment (UE), comprising: means for transmitting first non-positioning data in a first-occurring transmission opportunity of a plurality of transmission opportunities, wherein the first non-positioning data has a lower priority than a sidelink positioning reference signal (SL-PRS) scheduled to be transmitted in the first-occurring transmission opportunity, and wherein the first non-positioning data is transmitted in the first-occurring transmission opportunity based on a priority of sidelink positioning protocol (SLPP) data associated with the SL-PRS to be transmitted in a second-occurring transmission opportunity of the plurality of transmission opportunities having a lower priority than second non-positioning data scheduled to be transmitted in the second-occurring transmission opportunity; and means for transmitting the second non-positioning data in the second-occurring transmission opportunity.

Clause 64. The UE of clause 63, wherein the plurality of transmission opportunities is: a plurality of symbols of a slot, or a plurality of slots.

Clause 65. The UE of any of clauses 63 to 64, wherein the first-occurring transmission opportunity and the second-occurring transmission opportunity are consecutive transmission opportunities.

Clause 66. The UE of any of clauses 63 to 64, wherein the first-occurring transmission opportunity and the second-occurring transmission opportunity are separated by one or more transmission opportunities during which no data is scheduled to be transmitted.

Clause 67. The UE of any of clauses 63 to 66, wherein: the first non-positioning data is first uplink data or first sidelink data, and the second non-positioning data is second uplink data or second sidelink data.

Clause 68. The UE of any of clauses 63 to 67, wherein the SLPP data is at least a portion of: a SLPP Request Location Information message associated with the SL-PRS, or a SLPP Provide Location Information message associated with the SL-PRS.

Clause 69. The UE of any of clauses 63 to 68, wherein: a priority of the SLPP data is one of eight levels of priority, and a priority of the SL-PRS is one of eight levels of priority.

Clause 70. A non-transitory computer-readable medium storing computer-executable instructions that, when executed by a user equipment (UE), cause the UE to: transmit first non-positioning data in a first-occurring transmission opportunity of a plurality of transmission opportunities based on the first non-positioning data having a higher priority than a sidelink positioning reference signal (SL-PRS) scheduled to be transmitted in the first-occurring transmission opportunity; and transmit second non-positioning data in a second-occurring transmission opportunity of the plurality of transmission opportunities, wherein the second non-positioning data has a lower priority than sidelink positioning protocol (SLPP) data scheduled to be transmitted in the second-occurring transmission opportunity, and wherein the second non-positioning data is transmitted in the second-occurring transmission opportunity instead of the SLPP data scheduled to be transmitted in the second-occurring transmission opportunity based on the SLPP data being associated with the SL-PRS.

Clause 71. The non-transitory computer-readable medium of clause 70, further comprising computer-executable instructions that, when executed by the UE, cause the UE to: transmit the SLPP data in a third-occurring transmission opportunity based on the SLPP data having a higher priority than third non-positioning data scheduled to be transmitted in the third-occurring transmission opportunity.

Clause 72. The non-transitory computer-readable medium of clause 71, wherein the third-occurring transmission opportunity is the next transmission opportunity after the second-occurring transmission opportunity in which the SLPP data has a higher priority than non-positioning data.

Clause 73. The non-transitory computer-readable medium of any of clauses 70 to 72, wherein the plurality of transmission opportunities is: a plurality of symbols of a slot, or a plurality of slots.

Clause 74. The non-transitory computer-readable medium of any of clauses 70 to 73, wherein the first-occurring transmission opportunity and the second-occurring transmission opportunity are consecutive transmission opportunities.

Clause 75. The non-transitory computer-readable medium of any of clauses 70 to 73, wherein the first-occurring transmission opportunity and the second-occurring transmission opportunity are separated by one or more transmission opportunities during which no data is scheduled to be transmitted.

Clause 76. The non-transitory computer-readable medium of any of clauses 70 to 75, wherein: the first non-positioning data is first uplink data or first sidelink data, and the second non-positioning data is second uplink data or second sidelink data.

Clause 77. The non-transitory computer-readable medium of any of clauses 70 to 76, wherein the SLPP data is at least a portion of: a SLPP Request Location Information message associated with the SL-PRS, or a SLPP Provide Location Information message associated with the SL-PRS.

Clause 78. The non-transitory computer-readable medium of any of clauses 70 to 77, wherein: a priority of the SLPP data is one of eight levels of priority, and a priority of the SL-PRS is one of eight levels of priority.

Clause 79. A non-transitory computer-readable medium storing computer-executable instructions that, when executed by a user equipment (UE), cause the UE to: transmit a sidelink positioning reference signal (SL-PRS) in a first-occurring transmission opportunity of a plurality of transmission opportunities, wherein the SL-PRS has a lower priority than first non-positioning data scheduled to be transmitted in the first-occurring transmission opportunity, and wherein the SL-PRS is transmitted in the first-occurring transmission opportunity based on a priority of sidelink positioning protocol (SLPP) data associated with the SL-PRS to be transmitted in a second-occurring transmission opportunity of the plurality of transmission opportunities having a higher priority than second non-positioning data scheduled to be transmitted in the second-occurring transmission opportunity; and transmit the SLPP data in the second-occurring transmission opportunity.

Clause 80. The non-transitory computer-readable medium of clause 79, wherein the plurality of transmission opportunities is: a plurality of symbols of a slot, or a plurality of slots.

Clause 81. The non-transitory computer-readable medium of any of clauses 79 to 80, wherein the first-occurring transmission opportunity and the second-occurring transmission opportunity are consecutive transmission opportunities.

Clause 82. The non-transitory computer-readable medium of any of clauses 79 to 80, wherein the first-occurring transmission opportunity and the second-occurring transmission opportunity are separated by one or more transmission opportunities during which no data is scheduled to be transmitted.

Clause 83. The non-transitory computer-readable medium of any of clauses 79 to 82, wherein: the first non-positioning data is first uplink data or first sidelink data, and the second non-positioning data is second uplink data or second sidelink data.

Clause 84. The non-transitory computer-readable medium of any of clauses 79 to 83, wherein the SLPP data is at least a portion of: a SLPP Request Location Information message associated with the SL-PRS, or a SLPP Provide Location Information message associated with the SL-PRS.

Clause 85. The non-transitory computer-readable medium of any of clauses 79 to 84, wherein: a priority of the SLPP data is one of eight levels of priority, and a priority of the SL-PRS is one of eight levels of priority.

Clause 86. A non-transitory computer-readable medium storing computer-executable instructions that, when executed by a user equipment (UE), cause the UE to: transmit first non-positioning data in a first-occurring transmission opportunity of a plurality of transmission opportunities, wherein the first non-positioning data has a lower priority than a sidelink positioning reference signal (SL-PRS) scheduled to be transmitted in the first-occurring transmission opportunity, and wherein the first non-positioning data is transmitted in the first-occurring transmission opportunity based on a priority of sidelink positioning protocol (SLPP) data associated with the SL-PRS to be transmitted in a second-occurring transmission opportunity of the plurality of transmission opportunities having a lower priority than second non-positioning data scheduled to be transmitted in the second-occurring transmission opportunity; and transmit the second non-positioning data in the second-occurring transmission opportunity.

Clause 87. The non-transitory computer-readable medium of clause 86, wherein the plurality of transmission opportunities is: a plurality of symbols of a slot, or a plurality of slots.

Clause 88. The non-transitory computer-readable medium of any of clauses 86 to 87, wherein the first-occurring transmission opportunity and the second-occurring transmission opportunity are consecutive transmission opportunities.

Clause 89. The non-transitory computer-readable medium of any of clauses 86 to 87, wherein the first-occurring transmission opportunity and the second-occurring transmission opportunity are separated by one or more transmission opportunities during which no data is scheduled to be transmitted.

Clause 90. The non-transitory computer-readable medium of any of clauses 86 to 89, wherein: the first non-positioning data is first uplink data or first sidelink data, and the second non-positioning data is second uplink data or second sidelink data.

Clause 91. The non-transitory computer-readable medium of any of clauses 86 to 90, wherein the SLPP data is at least a portion of: a SLPP Request Location Information message associated with the SL-PRS, or a SLPP Provide Location Information message associated with the SL-PRS.

Clause 92. The non-transitory computer-readable medium of any of clauses 86 to 91, wherein: a priority of the SLPP data is one of eight levels of priority, and a priority of the SL-PRS is one of eight levels of priority.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more of the stated elements. Also, as used herein, the terms "has," "have," "having," "comprises," "comprising," "includes," "including," and the like does not preclude the presence of one or more additional elements (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of") or the alternatives are mutually exclusive (e.g., "one or more" should not be interpreted as "one and more"). Furthermore, although components, functions, actions, and instructions may be described or claimed in the singular, the plural is contemplated unless limitation to the singular is explicitly stated. Accordingly, as used herein, the articles "a," "an," "the," and "said" are intended to include one or more of the stated elements. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

What is claimed is:

1. A user equipment (UE), comprising:
one or more memories;
one or more transceivers; and
one or more processors communicatively coupled to the one or more memories and the one or more transceivers, the one or more processors, either alone or in combination, configured to:
    transmit, via the one or more transceivers, first non-positioning data in a first-occurring transmission opportunity of a plurality of transmission opportunities based on the first non-positioning data having a higher priority than a sidelink positioning reference signal (SL-PRS) scheduled to be transmitted in the first-occurring transmission opportunity; and
    transmit, via the one or more transceivers, second non-positioning data in a second-occurring transmission opportunity of the plurality of transmission opportunities, wherein the second non-positioning data has a lower priority than sidelink positioning protocol (SLPP) data scheduled to be transmitted in the second-occurring transmission opportunity, and wherein the second non-positioning data is transmitted in the second-occurring transmission opportunity instead of the SLPP data scheduled to be transmitted in the second-occurring transmission opportunity based on the SLPP data being associated with the SL-PRS.

2. The UE of claim 1, wherein the one or more processors, either alone or in combination, are further configured to:

transmit, via the one or more transceivers, the SLPP data in a third-occurring transmission opportunity based on the SLPP data having a higher priority than third non-positioning data scheduled to be transmitted in the third-occurring transmission opportunity.

3. The UE of claim 2, wherein the third-occurring transmission opportunity is the next transmission opportunity after the second-occurring transmission opportunity in which the SLPP data has a higher priority than non-positioning data.

4. The UE of claim 1, wherein the plurality of transmission opportunities is:

a plurality of symbols of a slot, or a plurality of slots.

5. The UE of claim 1, wherein the first-occurring transmission opportunity and the second-occurring transmission opportunity are consecutive transmission opportunities.

6. The UE of claim 1, wherein the first-occurring transmission opportunity and the second-occurring transmission opportunity are separated by one or more transmission opportunities during which no data is scheduled to be transmitted.

7. The UE of claim 1, wherein:

the first non-positioning data is first uplink data or first sidelink data, and the second non-positioning data is second uplink data or second sidelink data.

8. The UE of claim 1, wherein the SLPP data is at least a portion of:

a SLPP Request Location Information message associated with the SL-PRS, or a SLPP Provide Location Information message associated with the SL-PRS.

9. The UE of claim 1, wherein:

a priority of the SLPP data is one of eight levels of priority, and a priority of the SL-PRS is one of eight levels of priority.

10. A user equipment (UE), comprising:

one or more memories;

one or more transceivers; and one or more processors communicatively coupled to the one or more memories and the one or more transceivers, the one or more processors, either alone or in combination, configured to:

transmit, via the one or more transceivers, a sidelink positioning reference signal (SL-PRS) in a first-occurring transmission opportunity of a plurality of transmission opportunities, wherein the SL-PRS has a lower priority than first non-positioning data scheduled to be transmitted in the first-occurring transmission opportunity, and wherein the SL-PRS is transmitted in the first-occurring transmission opportunity based on a priority of sidelink positioning protocol (SLPP) data associated with the SL-PRS to be transmitted in a second-occurring transmission opportunity of the plurality of transmission opportunities having a higher priority than second non-positioning data scheduled to be transmitted in the second-occurring transmission opportunity; and transmit, via the one or more transceivers, the SLPP data in the second-occurring transmission opportunity.

11. The UE of claim 10, wherein the plurality of transmission opportunities is:

a plurality of symbols of a slot, or a plurality of slots.

12. The UE of claim 10, wherein the first-occurring transmission opportunity and the second-occurring transmission opportunity are consecutive transmission opportunities.

13. The UE of claim 10, wherein the first-occurring transmission opportunity and the second-occurring transmission opportunity are separated by one or more transmission opportunities during which no data is scheduled to be transmitted.

14. The UE of claim 10, wherein:

the first non-positioning data is first uplink data or first sidelink data, and the second non-positioning data is second uplink data or second sidelink data.

15. The UE of claim 10, wherein the SLPP data is at least a portion of:

a SLPP Request Location Information message associated with the SL-PRS, or a SLPP Provide Location Information message associated with the SL-PRS.

16. The UE of claim 10, wherein:

a priority of the SLPP data is one of eight levels of priority, and a priority of the SL-PRS is one of eight levels of priority.

17. A user equipment (UE), comprising:

one or more memories;

one or more transceivers; and one or more processors communicatively coupled to the one or more memories and the one or more transceivers, the one or more processors, either alone or in combination, configured to:

transmit, via the one or more transceivers, first non-positioning data in a first-occurring transmission opportunity of a plurality of transmission opportunities, wherein the first non-positioning data has a lower priority than a sidelink positioning reference signal (SL-PRS) scheduled to be transmitted in the first-occurring transmission opportunity, and wherein the first non-positioning data is transmitted in the first-occurring transmission opportunity based on a priority of sidelink positioning protocol (SLPP) data associated with the SL-PRS to be transmitted in a second-occurring transmission opportunity of the plurality of transmission opportunities having a lower priority than second non-positioning data scheduled to be transmitted in the second-occurring transmission opportunity; and transmit, via the one or more transceivers, the second non-positioning data in the second-occurring transmission opportunity.

18. The UE of claim 17, wherein the plurality of transmission opportunities is:

a plurality of symbols of a slot, or a plurality of slots.

19. The UE of claim 17, wherein the first-occurring transmission opportunity and the second-occurring transmission opportunity are consecutive transmission opportunities.

20. The UE of claim 17, wherein the first-occurring transmission opportunity and the second-occurring transmission opportunity are separated by one or more transmission opportunities during which no data is scheduled to be transmitted.

21. The UE of claim 17, wherein:

the first non-positioning data is first uplink data or first sidelink data, and the second non-positioning data is second uplink data or second sidelink data.

22. The UE of claim 17, wherein the SLPP data is at least a portion of:

a SLPP Request Location Information message associated with the SL-PRS, or a SLPP Provide Location Information message associated with the SL-PRS.

23. The UE of claim 17, wherein:

a priority of the SLPP data is one of eight levels of priority, and a priority of the SL-PRS is one of eight levels of priority.

24. A method of wireless communication performed by a user equipment (UE), comprising:

transmitting first non-positioning data in a first-occurring transmission opportunity of a plurality of transmission opportunities based on the first non-positioning data having a higher priority than a sidelink positioning reference signal (SL-PRS) scheduled to be transmitted in the first-occurring transmission opportunity; and transmitting second non-positioning data in a second-occurring transmission opportunity of the plurality of transmission opportunities, wherein the second non-positioning data has a lower priority than sidelink positioning protocol (SLPP) data scheduled to be transmitted in the second-occurring transmission opportunity, and wherein the second non-positioning data is transmitted in the second-occurring transmission opportunity instead of the SLPP data scheduled to be transmitted in the second-occurring transmission opportunity based on the SLPP data being associated with the SL-PRS.

25. The method of claim 24, further comprising:

transmitting the SLPP data in a third-occurring transmission opportunity based on the SLPP data having a higher priority than third non-positioning data scheduled to be transmitted in the third-occurring transmission opportunity.

26. The method of claim 25, wherein the third-occurring transmission opportunity is the next transmission opportunity after the second-occurring transmission opportunity in which the SLPP data has a higher priority than non-positioning data.

27. The method of claim 24, wherein the first-occurring transmission opportunity and the second-occurring transmission opportunity are consecutive transmission opportunities.

28. The method of claim 24, wherein the first-occurring transmission opportunity and the second-occurring transmission opportunity are separated by one or more transmission opportunities during which no data is scheduled to be transmitted.

29. The method of claim 24, wherein:

the first non-positioning data is first uplink data or first sidelink data, and the second non-positioning data is second uplink data or second sidelink data.

30. The method of claim 24, wherein:

a priority of the SLPP data is one of eight levels of priority, and a priority of the SL-PRS is one of eight levels of priority.

* * * * *